(12) United States Patent
Hayashi et al.

(10) Patent No.: US 11,465,137 B2
(45) Date of Patent: Oct. 11, 2022

(54) HONEYCOMB STRUCTURE AND DIE

(71) Applicant: DENSO CORPORATION, Kariya (JP)

(72) Inventors: Naohiro Hayashi, Kariya (JP); Kenichi Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 66 days.

(21) Appl. No.: 16/941,621

(22) Filed: Jul. 29, 2020

(65) Prior Publication Data
US 2020/0353455 A1 Nov. 12, 2020

Related U.S. Application Data

(63) Continuation of application No. PCT/JP2018/047139, filed on Dec. 21, 2018.

(30) Foreign Application Priority Data

Jan. 30, 2018 (JP) .............................. JP2018-013779

(51) Int. Cl.
*B01J 35/04* (2006.01)
*F01N 3/022* (2006.01)
*B01D 46/24* (2006.01)
*B28B 3/26* (2006.01)
*F01N 3/28* (2006.01)

(52) U.S. Cl.
CPC ................ *B01J 35/04* (2013.01); *B28B 3/26* (2013.01); *F01N 3/022* (2013.01); *F01N 3/28* (2013.01); *B01D 46/249* (2021.08)

(58) Field of Classification Search
None
See application file for complete search history.

(56) References Cited

U.S. PATENT DOCUMENTS

| 5,952,079 A | 9/1999 | Andou et al. |
| 2001/0003728 A1* | 6/2001 | Ito ....................... C04B 38/0006 428/116 |
| 2001/0006717 A1* | 7/2001 | Domesle .................. B01J 35/04 428/116 |
| 2002/0192426 A1 | 12/2002 | Ichikawa et al. |
| 2004/0206044 A1* | 10/2004 | Kondo .................... B28B 3/269 52/782.1 |

(Continued)

FOREIGN PATENT DOCUMENTS

JP S55-147154 11/1980

*Primary Examiner* — Elizabeth Collister
(74) *Attorney, Agent, or Firm* — Nixon & Vanderhye P.C.

(57) ABSTRACT

A honeycomb structure includes a central area and a reinforced outer peripheral area. For a boundary cell having cell walls with different wall thicknesses on two sides parallel with an imaginary parallel line, a thin wall thickness $t1<$ a thick wall thickness $t3$, an inner wall thickness $t2<$ an outer wall thickness $t4$, $t1=t2$, and $t3=t4$. The honeycomb structure includes a cross-shaped unit having a thin wall, an inner wall, a cell wall, and a cell wall and a cross-shaped unit having a thick wall, an outer wall, a cell wall, and a cell wall. The honeycomb structure also includes cross-shaped units extending vertically and horizontally from alternate cell vertexes arranged from a cell vertex as a starting point. In the central area and the reinforced outer peripheral area, the cell walls of each cross-shaped unit have a substantially equal wall thickness.

14 Claims, 14 Drawing Sheets

(56) References Cited

U.S. PATENT DOCUMENTS

| | | | | |
|---|---|---|---|---|
| 2005/0106083 A1* | 5/2005 | Hirai | ............... | B01J 35/04 |
| | | | | 428/116 |
| 2005/0181172 A1* | 8/2005 | Hirai | ............... | B01D 53/885 |
| | | | | 428/116 |
| 2014/0205794 A1* | 7/2014 | Tamai | ............... | B32B 3/12 |
| | | | | 428/116 |
| 2018/0257999 A1* | 9/2018 | Mori | ............... | B01D 46/2455 |

* cited by examiner

HONEYCOMB STRUCTURE AND DIE

CROSS-REFERENCE TO RELATED APPLICATION

This application is the U.S. bypass application of International Application No. PCT/JP2018/047139 filed Dec. 21, 2018 which designated the U.S. and claims priority to Japanese Patent Application No. 2018-13779, filed Jan. 30, 2018, the contents of both of which are incorporated herein by reference.

TECHNICAL FIELD

The present disclosure relates to a honeycomb structure and a die, and more particularly, to a honeycomb structure with cells quadrangular in cross section and a die.

BACKGROUND

In the field of vehicles such as automobiles, exhaust gas purification systems have conventionally been used to purify exhaust gas emitted from internal combustion engines. An exhaust gas purification system includes a ceramic honeycomb structure contained in an exhaust pipe and a catalyst component held in the honeycomb structure. The honeycomb structure typically includes a plurality of cells adjacent to each other, a plurality of cell walls forming the plurality of cells, and an outer peripheral wall provided outside the plurality of cell walls and holding the cell walls. The catalyst component is held on the cell wall surfaces. A typical ceramic honeycomb structure is extruded by feeding a green body into a die as a raw material for the honeycomb structure. The die includes a plurality of green body inlets through which a green body is fed, and a plurality of slits for receiving the green body fed through the green body inlets to form a portion as the cell walls.

SUMMARY

One aspect of the present disclosure is a honeycomb structure including a plurality of cells adjacent to each other and quadrangular in cross section, a plurality of cell walls forming the plurality of cells, and an outer peripheral wall provided outside the plurality of cell walls and holding the cell walls, and as viewed in a cross section perpendicular to a honeycomb central axis, the honeycomb structure satisfies requirements 1 to 5:

Requirement 1: the honeycomb structure includes a central area having cell walls with a wall thickness equal to the wall thickness of a cell wall of four surrounding cells around the honeycomb central axis or the wall thickness of a cell wall of a central cell having the cell center with the honeycomb central axis passing therethrough, and a reinforced outer peripheral area having cell walls around the central area, the cell walls having a wall thickness greater than the wall thickness of the cell wall of the surrounding cell or the cell wall of the central cell;

Requirement 2: a plurality of cells arranged on an imaginary parallel line passing through the honeycomb central axis and parallel with cell walls or a plurality of cells arranged along over an imaginary perpendicular line passing through the honeycomb central axis and orthogonal to cell walls in a manner to extend through the midpoints of the cell walls include a reference boundary cell having cell walls with different wall thicknesses on two sides parallel with the imaginary parallel line or the imaginary perpendicular line, and with the reference boundary cell including a thin wall being a thin cell wall on one side parallel with the imaginary parallel line or the imaginary perpendicular line and having a wall thickness represented as $t1$, a thick wall being a thick cell wall on the other side parallel with the imaginary parallel line or the imaginary perpendicular line and having a wall thickness represented as $t3$, an inner wall being a cell wall adjacent to the honeycomb center and orthogonal to the imaginary parallel line or the imaginary perpendicular line and having a wall thickness represented as $t2$, and an outer wall being a cell wall adjacent to the honeycomb periphery and orthogonal to the imaginary parallel line or the imaginary perpendicular line and having a wall thickness represented as $t4$, $t1<t3$, $t2<t4$, $t1=t2$, and $t3=t4$;

Requirement 3: the honeycomb structure includes a first reference cross-shaped unit having four cell walls: the thin wall, the inner wall, the cell wall extending in the direction opposite to the thin wall from a first reference cell vertex corresponding to the connection between the thin wall and the inner wall, and the cell wall extending from the first reference cell vertex in the direction opposite to the inner wall, and a second reference cross-shaped unit having four cell walls: the thick wall, the outer wall, the cell wall extending in the direction opposite to the thick wall from a second reference cell vertex corresponding to the connection between the thick wall and the outer wall, and the cell wall extending from the second reference cell vertex in the direction opposite to the outer wall;

Requirement 4: the honeycomb structure includes a plurality of cross-shaped units each having four cell walls extending vertically and horizontally from and connected to each other at alternate cell vertexes arranged along the cell walls from the first reference cell vertex or the second reference cell vertex as a starting point; and Requirement 5: for every cross-shaped unit in the central area and the reinforced outer peripheral area, the cell walls of each of the cross-shaped units have a substantially equal wall thickness.

Another aspect of the present disclosure is a die for extruding a honeycomb structure including a plurality of cells adjacent to each other and quadrangular in cross section, a plurality of cell walls forming the plurality of cells, and an outer peripheral wall provided outside the plurality of cell walls and holding the cell walls, and the die includes:

a first die portion including a plurality of green body inlets through which a green body is fed as a raw material for the honeycomb structure; and a second die portion including a plurality of slits for receiving the green body fed through the green body inlets to form a portion as the plurality of cell walls in the honeycomb structure.

The second die portion includes a central slit area having slits for forming a portion as cell walls with a wall thickness equal to the wall thickness of a cell wall of four surrounding cells around the honeycomb central axis or the wall thickness of a cell wall of a central cell having the cell center with the honeycomb central axis passing therethrough, and a peripheral slit area having slits around the central slit area, the slits being wider than the slits of the central slit area, the plurality of green body inlets are positioned at not all slit vertexes each corresponding to the slit connection between four slits, and positioned at alternate slit vertexes along the slits, and the four slits extending radially from the slit vertex adjacent to each green body inlet have a substantially equal width.

BRIEF DESCRIPTION OF THE DRAWINGS

The features and advantages of the present disclosure will be made clearer by the following detailed description, given referring to the appended drawings. In the accompanying drawings.

DETAILED DESCRIPTION OF THE PREFERRED EMBODIMENTS

Figure 1:
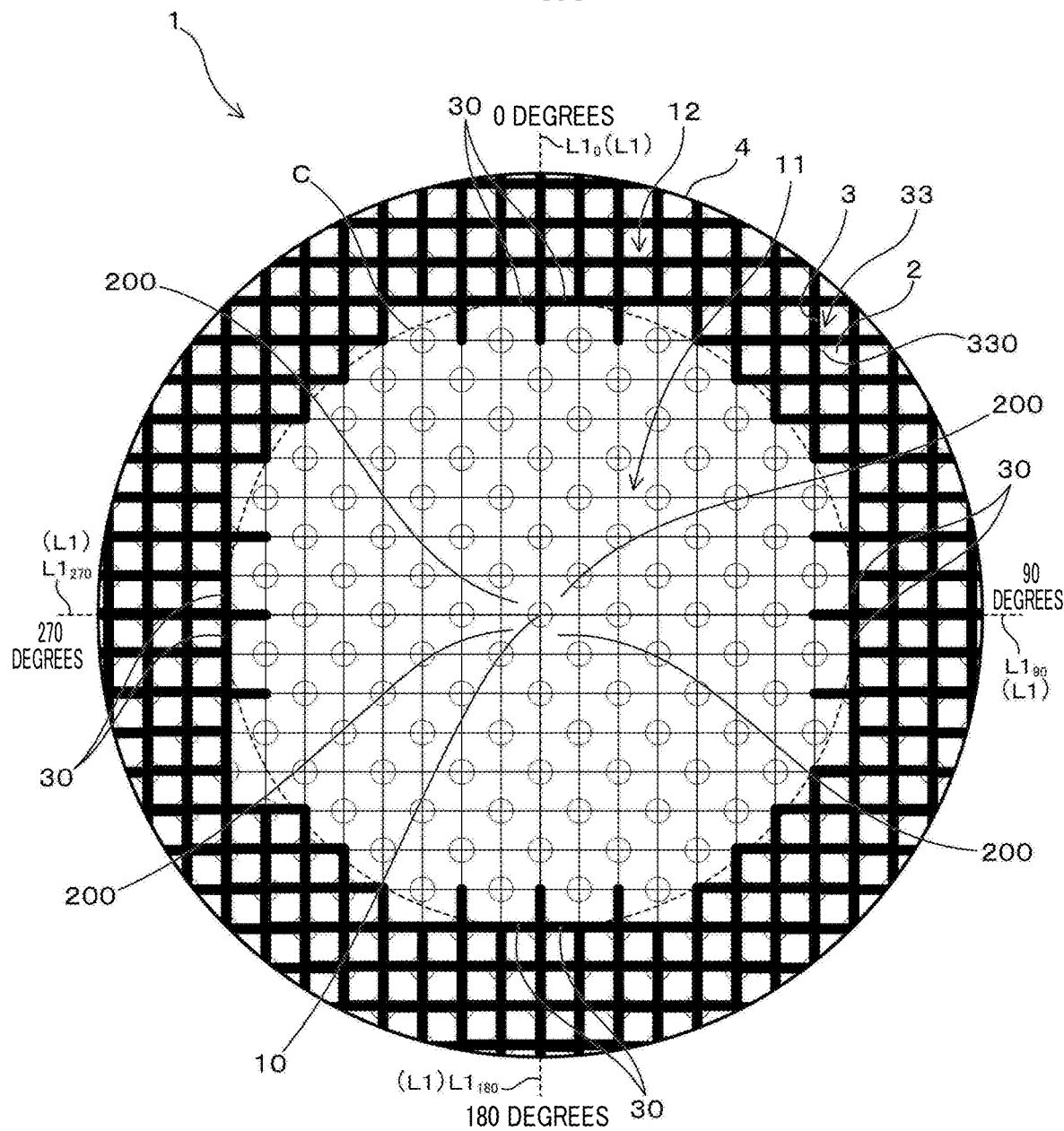
FIG. 1 is a schematic diagram illustrating the cell wall arrangement of a honeycomb structure according to a first embodiment.

JP 4473505 B discloses a honeycomb structure with a plurality of cells quadrangular in cross section. In the honeycomb structure, the cells from the starting cell that is an outermost peripheral cell to the end cell that is any cell within the range of the 5th to the 20th cells have a cell partition thickness greater than a basic cell partition thickness.

Emission control and fuel efficiency regulations, which have been tightened recently, require exhaust gas purification systems to have a shorter warm-up period and less pressure loss. Accordingly, the cell walls of honeycomb structures have become thinner and thinner year by year. However, thinning walls reduces the structural strength of the honeycomb structure. As a result, during a canning process in which the honeycomb structure holding its catalyst component is housed in an exhaust pipe, the honeycomb structure is prone to breakage due to compressive stress applied radially.

As described above, techniques for preventing breakage during canning include a method of improving the structural strength by thickening the cell walls across the area of several cells from the outer periphery of the honeycomb structure toward the honeycomb central axis. However, excessively thickening cell walls would cause a local distortion such as a thin wall site or a green body shortage in the outer periphery of the article during the process of extruding the honeycomb structure. Such a shape defect is induced because the cell wall arrangement requires a green body to be charged from one green body inlet in a die into a plurality of slits with different widths. More specifically, if a green body is charged from one green body inlet in a die into a plurality of slits with different widths, the green body does not flow evenly in narrow slits having a high resistance to the flow of the green body. As a result, distortion such as described above tends to be induced.

Thus, a conventional honeycomb structure with its outer periphery reinforced has a cell wall arrangement that may cause a local distortion during extrusion, and the distortion may be a break starting point to reduce the structural strength, making it difficult to prevent breakage caused by stress concentration during canning.

An object of the present disclosure is to provide a honeycomb structure that, even with its outer peripheral cell walls thickened, avoids a reduction in the structural strength due to distortion and thus prevents breakage caused by stress concentration during canning, and a die for forming the honeycomb structure.

One aspect of the present disclosure is a honeycomb structure including a plurality of cells adjacent to each other and quadrangular in cross section, a plurality of cell walls forming the plurality of cells, and an outer peripheral wall provided outside the plurality of cell walls and holding the cell walls, and as viewed in a cross section perpendicular to a honeycomb central axis, the honeycomb structure satisfies requirements 1 to 5:

Requirement 1: the honeycomb structure includes a central area having cell walls with a wall thickness equal to the wall thickness of a cell wall of four surrounding cells around the honeycomb central axis or the wall thickness of a cell wall of a central cell having the cell center with the honeycomb central axis passing therethrough, and a reinforced outer peripheral area having cell walls around the central area, the cell walls having a wall thickness greater than the wall thickness of the cell wall of the surrounding cell or the cell wall of the central cell;

Requirement 2: a plurality of cells arranged on an imaginary parallel line passing through the honeycomb central axis and parallel with cell walls or a plurality of cells arranged along over an imaginary perpendicular line passing through the honeycomb central axis and orthogonal to cell walls in a manner to extend through the midpoints of the cell walls include a reference boundary cell having cell walls with different wall thicknesses on two sides parallel with the imaginary parallel line or the imaginary perpendicular line, and with the reference boundary cell including a thin wall being a thin cell wall on one side parallel with the imaginary parallel line or the imaginary perpendicular line and having a wall thickness represented as t1, a thick wall being a thick cell wall on the other side parallel with the imaginary parallel line or the imaginary perpendicular line and having a wall thickness represented as t3, an inner wall being a cell wall adjacent to the honeycomb center and orthogonal to the imaginary parallel line or the imaginary perpendicular line and having a wall thickness represented as t2, and an outer wall being a cell wall adjacent to the honeycomb periphery and orthogonal to the imaginary parallel line or the imaginary perpendicular line and having a wall thickness represented as t4, $t1<t3$, $t2<t4$, $t1=t2$, and $t3=t4$;

Requirement 3: the honeycomb structure includes a first reference cross-shaped unit having four cell walls: the thin wall, the inner wall, the cell wall extending in the direction opposite to the thin wall from a first reference cell vertex corresponding to the connection between the thin wall and the inner wall, and the cell wall extending from the first reference cell vertex in the direction opposite to the inner wall, and a second reference cross-shaped unit having four cell walls: the thick wall, the outer wall, the cell wall extending in the direction opposite to the thick wall from a second reference cell vertex corresponding to the connection between the thick wall and the outer wall, and the cell wall extending from the second reference cell vertex in the direction opposite to the outer wall;

Requirement 4: the honeycomb structure includes a plurality of cross-shaped units each having four cell walls extending vertically and horizontally from and connected to each other at alternate cell vertexes arranged along the cell walls from the first reference cell vertex or the second reference cell vertex as a starting point; and Requirement 5: for every cross-shaped unit in the central area and the reinforced outer peripheral area, the cell walls of each of the cross-shaped units have a substantially equal wall thickness.

Another aspect of the present disclosure is a die for extruding a honeycomb structure including a plurality of cells adjacent to each other and quadrangular in cross section, a plurality of cell walls forming the plurality of cells, and an outer peripheral wall provided outside the plurality of cell walls and holding the cell walls, and the die includes:

a first die portion including a plurality of green body inlets through which a green body is fed as a raw material for the honeycomb structure; and a second die portion including a plurality of slits for receiving the green body fed through the green body inlets to form a portion as the plurality of cell walls in the honeycomb structure.

The second die portion includes a central slit area having slits for forming a portion as cell walls with a wall thickness equal to the wall thickness of a cell wall of four surrounding cells around the honeycomb central axis or the wall thickness of a cell wall of a central cell having the cell center with the honeycomb central axis passing therethrough, and a peripheral slit area having slits around the central slit area, the slits being wider than the slits of the central slit area, the plurality of green body inlets are positioned at not all slit vertexes each corresponding to the slit connection between four slits, and positioned at alternate slit vertexes along the slits, and the four slits extending radially from the slit vertex adjacent to each green body inlet have a substantially equal width.

The honeycomb structure has the configuration described above, and for every cross-shaped unit in the central area and the reinforced outer peripheral area, the cell walls of each of the cross-shaped units have a substantially equal wall thickness. Thus, when the honeycomb structure is extruded through a die having a plurality of green body inlets and a plurality of slits, the cross-shaped units may be formed without feeding a green body to all slit vertexes corresponding to the slit connections each between four slits. The cross-shaped units may be formed by feeding a green body to each of the alternate slit vertexes along the slits from the one corresponding green body inlet, and spreading the green body from the slit vertex evenly into the four slits with an equal width. More specifically, the honeycomb structure includes the cross-shaped units each having cell walls with an equal wall thickness, and thus allows, during the formation of each cross-shaped unit, reduction in the variance of resistance to the green body flow among the four slits extending from the slit vertex. Accordingly, the honeycomb structure, while having the reinforced outer peripheral area, is less likely to suffer local distortion during extrusion. Therefore, the honeycomb structure avoids a reduction in the structural strength due to distortion and prevents breakage caused by stress concentration during canning.

The die has the configuration described above. Thus, when the honeycomb structure is extruded through the die, the green body may be fed to not all slit vertexes corresponding to the slit connections each between four slits. The green body may be fed to each of the alternate slit vertexes along the slits from the one corresponding green body inlet, and may be spread from the slit vertex evenly into the four slits with an equal width. More specifically, the die, in which the four slits extending radially from the slit vertex adjacent to each green body inlet have a substantially equal width, allows reduction in the variance of resistance to the green body flow among the four slits. Accordingly, the die reduces the possibility of the occurrence of a local distortion during the extrusion of the reinforced outer peripheral area of the honeycomb structure. Therefore, the die can form the honeycomb structure capable of avoiding a reduction in the structural strength due to distortion.

First Embodiment

A honeycomb structure according to a first embodiment will now be described with reference to FIGS. 1 to 3. As illustrated in FIG. 1, a honeycomb structure 1 according to the present embodiment is formed from ceramic (e.g., cordierite) and includes a plurality of cells 2 adjacent to each other and quadrangular in cross section, a plurality of cell walls 3 forming the plurality of cells 2, and an outer peripheral wall 4 provided outside the plurality of cell walls 3 and holding the cell walls 3. For convenience, the thickness of each cell wall 3 in each figure is represented by the thickness of the line.

In the present embodiment, the cells 2 are through-holes extending along a honeycomb central axis 10, which is an axis passing through the center of the honeycomb structure 1. The cells 2 are parts serving as flow channels through which exhaust gas to be purified flows. It is noted that the cross section in the above phrase "quadrangular in cross section" means a cross section perpendicular to the honeycomb central axis 10. The "quadrangular" in the above phrase "quadrangular in cross section" is not necessarily limited to a square, and may mean quadrangles other than a square, including a quadrangle with rounded corners and a quadrangle skewed accidentally during manufacturing. Each of the cell walls 3 is connected and integrated with the adjoining cell walls 3. Each cell wall 3 has a catalyst component supported on the wall surfaces facing the cells 2 when the honeycomb structure 1 is used. The outer peripheral wall 4 is circular as viewed in a cross section perpendicular to the honeycomb central axis 10. The outer peripheral wall 4 has an inner surface connected with a plurality of cell walls 3 adjacent to the inner surface of the outer peripheral wall 4. Thus, the cell walls 3 are integrally held by the outer peripheral wall 4.

The honeycomb structure 1 satisfies requirements 1 to 5 described below, as viewed in a cross section perpendicular to the honeycomb central axis 10. Each requirement will now be described.

Requirement 1

The honeycomb structure includes a central area having cell walls with a wall thickness equal to that of the cell walls of the four surrounding cells around the honeycomb central axis, and a reinforced outer peripheral area having cell walls around the central area that have a wall thickness greater than that of the cell walls of the surrounding cells. Requirement 1 will now be described.

As illustrated in FIG. 1, the honeycomb structure 1 includes a central area 11 and a reinforced outer peripheral area 12. When the four cells 2 surrounding the honeycomb central axis 10 are defined as surrounding cells 200, the central area 11 has cell walls 3 with a wall thickness equal to that of the cell walls 3 of the surrounding cells 200. Each surrounding cell 200 has four cell walls 3 that divide it from the cells 2 around it. In the four surrounding cells 200, each of the cell walls 3 extending vertically and horizontally from the honeycomb central axis 10 is shared by the adjacent surrounding cells 200 across it. The wall thickness of the cell walls 3 of the surrounding cells 200 is specifically represented as the average of the wall thicknesses of the cell walls 3 that form the four surrounding cells 200. The central area 11 basically includes multiple cell walls 3 unthickened compared with the reinforced outer peripheral area 12. Note that in calculating the wall thickness of the cell walls 3 disposed around the surrounding cells 200 in the central area 11, the wall thickness of some thickened cell walls 3 inserted from the reinforced outer peripheral area 12 into the central area 11 is excluded in relation to requirement 5 described later.

The reinforced outer peripheral area 12 has cell walls 3 around the central area 11 that have a wall thickness greater than that of the cell walls 3 of the surrounding cells 200. More specifically, the reinforced outer peripheral area 12 includes multiple cell walls 3 thickened compared with the central area 11. In the present embodiment, as illustrated in FIG. 1, every cell wall 3 in the reinforced outer peripheral area 12 has the same wall thickness. As described later in another embodiment, the reinforced outer peripheral area 12 may include thickened cell walls 3 with different wall thicknesses, as long as requirement 5 described later is satisfied.

Requirement 2

The plurality of cells arranged on an imaginary parallel line passing through the honeycomb central axis and parallel with cell walls include a reference boundary cell having cell walls with different wall thicknesses on the two sides parallel with the imaginary parallel line, and with the reference boundary cell including a thin wall that is a thin cell wall on one side parallel with the imaginary parallel line and has a wall thickness represented as t1, a thick wall that is a thick cell wall on the other side parallel with the imaginary parallel line and has a wall thickness represented as t3, an inner wall that is a cell wall adjacent to the honeycomb center and orthogonal to the imaginary parallel line and has a wall thickness represented as t2, and an outer wall that is a cell wall adjacent to the honeycomb periphery and orthogonal to the imaginary parallel line and has a wall thickness represented as t4, $t1<t3$, $t2<t4$, $t1=t2$, and $t3=t4$. Requirement 2 will now be described.

FIG. 1 shows dashed lines $L1_0$, $L1_{90}$, $L1_{180}$, and $L1_{270}$ passing through the honeycomb central axis 10 and parallel with cell walls 3. In FIG. 1, when one dashed line passing through the honeycomb central axis 10 and parallel with cell walls 3 (in FIG. 1, the dashed line $L1_0$ in the direction of 12 o'clock) is assumed to extend in the 0-degree direction, the directions of the dashed lines $L1_{90}$, $L1_{180}$, and $L1_{270}$ respectively at 90 degrees, 180 degrees, and 270 degrees clockwise from the dashed line $L1_0$ are the 90-degree direction, the 180-degree direction, and the 270-degree direction. FIG. 2 is an enlarged view of cells 2 and cell walls 3 near $L1_0$, $L1_{90}$, $L1_{180}$, or $L1_{270}$ in FIG. 1.

As illustrated in FIG. 1, the dashed lines $L1_0$, $L1_{90}$, $L1_{180}$, and $L1_{270}$ in the four directions of 90 degrees×n (note that n=0, 1, 2, and 3) extend through the honeycomb central axis 10 and are parallel with cell walls 3, and thus each of them is the imaginary parallel line L1 in requirement 2. The imaginary parallel line L1 is a straight line extending in a honeycomb radial direction through the honeycomb central axis 10. In each of the directions of 90 degrees×n (note that n=0, 1, 2, and 3), when the plurality of cells 2 arranged on the imaginary parallel line L1 are seen from the outer peripheral wall 4 toward the honeycomb central axis 10, a cell 2 appears at a certain site with cell walls 3 differing in thickness from the adjacent cells 2, as illustrated in FIG. 2. For the cell 2, the cell walls 3 on the two sides parallel with the imaginary parallel line L1 have different thicknesses. This cell 2 is a reference boundary cell 21.

The reference boundary cell 21 will now be considered. In the reference boundary cell 21, the wall thickness of a thin wall 3a that is the thin cell wall 3 on one side parallel with the imaginary parallel line L1 is represented as t1. The wall thickness of a thick wall 3c that is the thick cell wall 3 on the other side parallel with the imaginary parallel line L1 is represented as t3. The wall thickness of an inner wall 3b that is the cell wall 3 adjacent to the honeycomb center and orthogonal to the imaginary parallel line L1 is represented as t2. The wall thickness of an outer wall 3d that is the cell wall 3 adjacent to the honeycomb periphery and orthogonal to the imaginary parallel line L1 is represented as t4. Then, for the reference boundary cell 21, $t1<t3$, $t2<t4$, $t1=t2$, and $t3=t4$.

The above-mentioned wall thicknesses of the thin wall 3a, the thick wall 3c, the outer wall 3d, and the inner wall 3b of the reference boundary cell 21 are respectively the average wall thickness measurement of the thin walls 3$a$, the average wall thickness measurement of the thick walls 3$c$, the average wall thickness measurement of the inner walls 3$b$, and the average wall thickness measurement of the outer walls 3$d$ of the reference boundary cells 21 that appear similarly in the directions of 90 degrees×n (note that n=0, 1, 2, and 3).

Requirement 3

The honeycomb structure includes a first reference cross-shaped unit having four cell walls: a thin wall, an inner wall, a cell wall extending in the direction opposite to the thin wall from a first reference cell vertex corresponding to the connection between the thin wall and the inner wall, and a cell wall extending from the first reference cell vertex in the direction opposite to the inner wall, and a second reference cross-shaped unit having four cell walls: a thick wall, an outer wall, a cell wall extending in the direction opposite to the thick wall from a second reference cell vertex corresponding to the connection between the thick wall and the outer wall, and a cell wall extending from the second reference cell vertex in the direction opposite to the outer wall. Requirement 3 will now be described.

Figure 2:
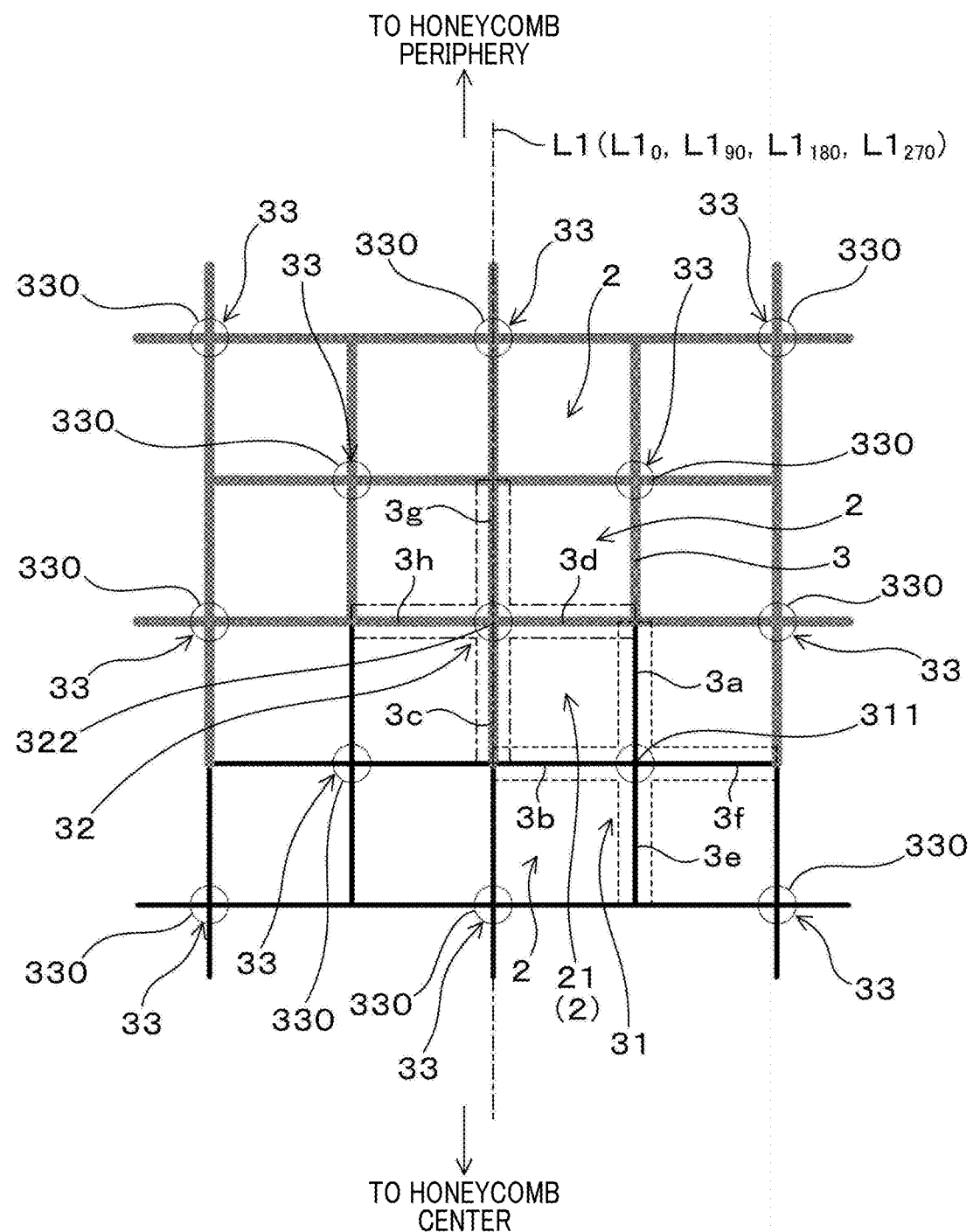
FIG. 2 is a diagram for illustrating the concept of a reference boundary cell, a reference cross-shaped unit, and a cross-shaped unit for a honeycomb structure including four surrounding cells around the honeycomb central axis.
Figure 3:
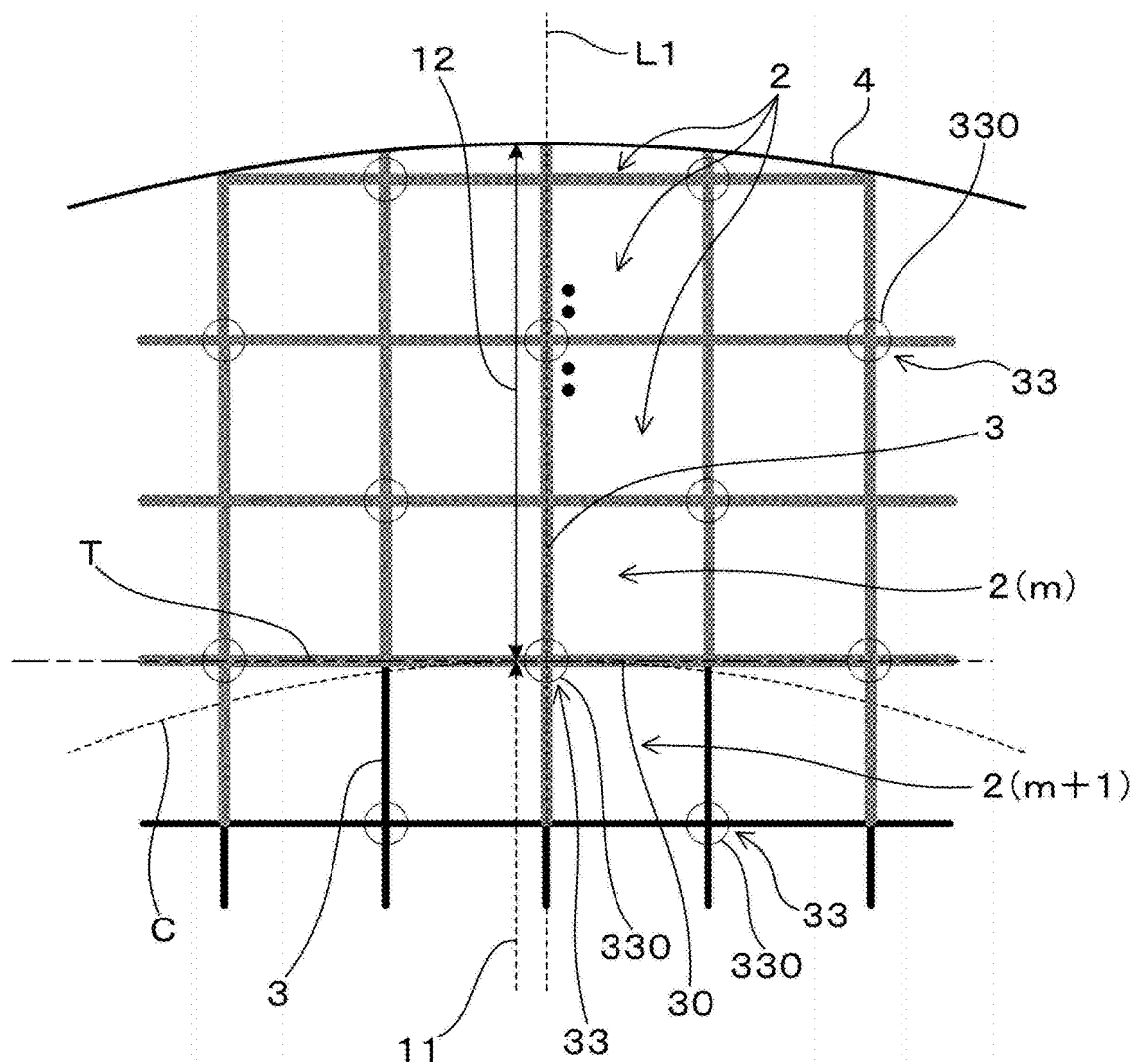
FIG. 3 is a diagram for illustrating a way of counting the number of reinforced cells in a reinforced outer peripheral area.

As shown in FIG. 2, a first reference cross-shaped unit 31 is defined by four cell walls 3: a thin wall 3$a$, an inner wall 3$b$, a cell wall 3$e$ extending in the direction opposite to the thin wall 3$a$ from a first reference cell vertex 311 corresponding to the connection between the thin wall 3$a$ and the inner wall 3$b$, and a cell wall 3$f$ extending from the first reference cell vertex 311 in the direction opposite to the inner wall 3$b$. A second reference cross-shaped unit 32 is defined by four cell walls 3: a thick wall 3$c$, an outer wall 3$d$, a cell wall 3$g$ extending in the direction opposite to the thick wall 3$c$ from a second reference cell vertex 322 corresponding to the connection between the thick wall 3$c$ and the outer wall 3$d$, and a cell wall 3$h$ extending from the second reference cell vertex 322 in the direction opposite to the outer wall 3$d$.

The wall thicknesses of the cell wall 3$e$, the cell wall 3$f$, the cell wall 3$g$, and the cell wall 3$h$ are respectively the average wall thickness measurement of the cell walls 3$e$, the average wall thickness measurement of the cell walls 3$f$, the average wall thickness measurement of the cell walls 3$g$, and the average wall thickness measurement of the cell walls 3$h$ of the reference boundary cells 21 that appear similarly in the directions of 90 degrees×n (note that n=0, 1, 2, and 3).

Requirement 4

The honeycomb structure includes a plurality of cross-shaped units each of which has four cell walls extending vertically and horizontally from and connected to each other at alternate cell vertexes arranged along the cell walls from the first reference cell vertex or the second reference cell vertex cell as a starting point. Requirement 4 will now be described.

The honeycomb structure 1 includes cell wall sets each having four cell walls 3 extending radially from the corresponding cell vertex 330 of a plurality of cells 2. As shown in FIG. 1, each of the central area 11 and the reinforced outer peripheral area 12 has two possibilities of how to select the cell wall sets. In one case, the honeycomb structure 1 may include a plurality of cell wall sets having four cell walls 3 extending radially from circled cell vertexes 330 shown in FIG. 1. In the other case, the honeycomb structure 1 may include a plurality of cell wall sets having four cell walls 3 extending radially from uncircled cell vertex 330 shown in FIG. 1.

Requirement 4 is intended to choose one from the above two possibilities of selecting cell wall sets. More specifically, cross-shaped units 33 are cell wall sets each having four cell walls 3 extending vertically and horizontally from and connected to each other at alternate cell vertexes 330 arranged along the cell walls 3 from the first reference cell vertex 311 or the second reference cell vertex 322 defined in requirement 3 as a starting point. Thus, the cross-shaped units 33 in the present embodiment are the cell wall sets having the four cell walls 3 extending radially from the circled cell vertexes 330 shown in FIG. 1. Accordingly, the cell wall sets having the four cell walls 3 extending radially from the uncircled cell vertexes 330 shown in FIG. 1 do not serve as cross-shaped units 33.

The honeycomb structure 1 includes a plurality of cross-shaped units 33. More specifically, the honeycomb structure 1 has a cell arrangement in which adjacent cross-shaped units 33 are connected to each other.

Requirement 5

For every cross-shaped unit in the central area and the reinforced outer peripheral area, the cell walls of each of the cross-shaped units have a substantially equal wall thickness. Requirement 5 will now be described.

The cross-shaped units 33 determined in requirement 4 stated above are minimum units for forming cells 2 quadrangular in cross section. In the present embodiment, as specifically illustrated in FIG. 1, for the cross-shaped units 33 with their cell vertexes 330 within the central area 11, each cross-shaped unit 33 has cell walls 3 with an equal wall thickness, and the cell walls 3 of one cross-shaped unit 33 are also as thick as those of another cross-shaped unit 33. For the cross-shaped units 33 with their cell vertexes 330 within the reinforced outer peripheral area 12, each cross-shaped unit 33 has cell walls 3 with an equal wall thickness, and all the cell walls 3 of each cross-shaped unit 33 are thicker than the cell walls 3 of each cross-shaped unit 33 with its cell vertex 330 within the central area 11.

The honeycomb structure 1 has the configuration described above, and for all the cross-shaped units 33 within the central area 11 and the reinforced outer peripheral area 12, each cross-shaped unit 33 has cell walls 3 with an equal wall thickness. Thus, for example, as described later in a sixth embodiment, when the honeycomb structure 1 is extruded through a die 5 having a plurality of green body inlets 510 and a plurality of slits 520, the cross-shaped units 33 may be formed without feeding a green body to all slit vertexes 521 corresponding to the slit connections each between four slits 520. The cross-shaped units 33 may be formed by feeding a green body to each of the alternate slit vertexes 521 along the slits 520 from the one corresponding green body inlet 510, and spreading the green body from the slit vertex 521 evenly into the four slits 520 with an equal width. More specifically, the honeycomb structure 1 includes the cross-shaped units 33 each having cell walls 3 with an equal wall thickness, and thus allows, during the formation of each cross-shaped unit 33, reduction in the variance of resistance to the green body flow among the four slits 520 extending from the slit vertex 521. Accordingly, the honeycomb structure 1, while having the reinforced outer peripheral area 12, is less likely to suffer local distortion during extrusion. Therefore, the honeycomb structure 1 is capable of avoiding a reduction in the structural strength due to distortion and preventing breakage caused by stress concentration during canning. The honeycomb structure 1 may have a wall thickness difference ratio of 10% or less, which is calculated in accordance with the formula: $100 \times (t_{max} - t_{min})/t_{max}$, where $t_{max}$ denotes the maximum wall thickness of the four cell walls 3 forming each cross-shaped unit 33, and t min denotes the minimum wall thickness.

When each cross-shaped unit 33 of the honeycomb structure 1 is formed, the above configuration facilitates reducing the variance of resistance to the green body flow among the four slits 520 extending from the slit vertex 521, and reduces the possibility of the occurrence of shape defect such as unconnected cell walls 3 between adjacent cross-shaped units 33. Thus, the above configuration enables the production of the honeycomb structure 1 with sufficient average isostatic strength and minimum isostatic strength even though the materials may vary. The above configuration also enables the production of the honeycomb structure 1 effective at reducing the defective rate related to distortions.

To ensure the structural strength of the honeycomb structure 1, the wall thickness difference ratio may be preferably less than 10%, more preferably 9% or less, yet more preferably 8% or less, still more preferably 7% or less, and yet still more preferably 6% or less. The wall thickness difference ratio may be even yet still more preferably 5% or less. Even when wall thicknesses differ, such a wall thickness difference ratio may lower the possibility of the formation of a cross-shaped unit 33 having distortion that may reduce the structural strength of the honeycomb structure 1.

In the honeycomb structure 1, the number of cells included in the reinforced outer peripheral area 12 from the outer peripheral wall 4 toward the honeycomb central axis 10 is determined in the manner described below.

In each of the directions of 90 degrees×n (note that n=0, 1, 2, and 3), the first cell is assumed to be the cell 2 on the imaginary parallel line L1 and on the outer peripheral wall 4. Although the cell 2 on the outer peripheral wall 4 is usually not quadrangular in cross section, such an incomplete cell also counts as a cell 2. In each of the directions of 90 degrees×n (note that n=0, 1, 2, and 3), the number of cells 2 arranged on the imaginary parallel line L1 is counted from the first cell toward the honeycomb central axis 10. Then, as illustrated in FIG. 3, at the (m+1)-th cell from the cell 2 on the outer peripheral wall 4, a cell 2 appears that has a cross-shaped unit 33 formed of cell walls 3 with the wall thickness equal to that of the cell walls 3 of the surrounding cells 200. Note that m is a natural number. The (m+1)-th cell 2 and the previous m-th cell 2 have a boundary cell wall 3 between them, which is referred to as an inner-outer boundary wall 30. The inner-outer boundary wall 30 is divided into two parts in the wall thickness direction by a bisector T, and an imaginary circle C touching the bisector T is drawn. The imaginary circle C is a concentric circle with its center coinciding with the honeycomb central axis 10. When the cell walls 3 of the cross-shaped units 33 with their cell vertexes 330 outside the imaginary circle C are reinforced to be thicker than the cell walls 3 of the surrounding cells 200, the reinforced outer peripheral area 12 extends to the m-th cell 2 in the direction from the outer peripheral wall 4 to the honeycomb central axis 10. In other words, the reinforced outer peripheral area 12 includes m reinforced cells. The imaginary circle C is the boundary circle between the central area 11 and the reinforced outer peripheral area 12. However, in relation to requirement 5 described above, the central area 11 may include, in its periphery, some cell walls 3 thicker than the cell walls 3 of the surrounding cells 200. For example, in relation to requirement 5 described above, the periphery of the central area 11 may have some of the cell walls 3 of cross-shaped units 33 with their cell vertexes 330 within the reinforced outer peripheral area 12.

For the honeycomb structure 1 in FIG. 1, the present embodiment is an example in which the reinforced outer peripheral area 12 extends to the fourth cell 2 in the direction from the outer peripheral wall 4 to the honeycomb central axis 10, and it is understood that the reinforced outer peripheral area 12 includes four reinforced cells. The present embodiment also shows an example in which the cell walls 3 forming the cells 2 in the reinforced outer peripheral area 12 have a substantially equal wall thickness among the first to the fourth cells 2 from the outer peripheral wall 4 toward the honeycomb central axis 10.

In the honeycomb structure 1, the reinforced outer peripheral area 12 is preferably an area ranging from the outer peripheral wall 4 to the fourth or any subsequent cell 2 in the direction toward the honeycomb central axis 10. This is because the honeycomb structure 1 with its reinforced outer peripheral area 12 having four or more reinforced cells advantageously has isostatic strength that can be improved more easily than a honeycomb structure 1 with its reinforced outer peripheral area 12 having less than four reinforced cells. Furthermore, it has been found by CAE analysis that the stress generated in the honeycomb structure 1 having cells 2 quadrangular in cross section increases toward the outer periphery. In particular, the area ranging from the outer peripheral wall 4 to the fourth cell 2 in the direction toward the honeycomb central axis 10 has high stress concentration during canning Thus, the above configuration enables effective prevention of breakage caused by stress concentration during canning and has an advantage in ease of improvement in the structural strength of the honeycomb structure 1.

To ensure the above effects, the reinforced outer peripheral area 12 may be more preferably an area ranging from the outer peripheral wall 4 to the fifth or any subsequent cell 2 in the direction toward the honeycomb central axis 10.

In the honeycomb structure 1, the reinforced outer peripheral area 12 is preferably an area ranging from the outer peripheral wall 4 to the 20th or any previous cell 2 in the direction toward the honeycomb central axis 10. Even if the reinforced outer peripheral area 12 extends to any cell 2 subsequent to the 20th cell in the direction from the outer peripheral wall 4 to the honeycomb central axis 10, the structural strength of the honeycomb structure 1 will not be improved significantly. The number of cells of the honeycomb structure 1 increases toward the outer periphery. Accordingly, thickening the cell walls 3 adjacent to the outer periphery increases pressure loss in the honeycomb structure 1. In particular, when the reinforced outer peripheral area 12 includes more than 20 reinforced cells, the pressure loss in the honeycomb structure 1 tends to increase sharply. Thus, the above configuration enables the avoidance of an increase in pressure loss and a reduction in the structural strength due to distortion, and the prevention of breakage caused by stress concentration during canning.

To ensure the above effects, the reinforced outer peripheral area 12 may be more preferably an area ranging from the outer peripheral wall 4 to the 18th or any previous cell 2 in the direction toward the honeycomb central axis 10. The honeycomb structure 1 may have a cell density of, for example, 46.5 cells/cm$^2$ to 155 cells/cm$^2$ (300 cpsi to 1000 cpsi).

Second Embodiment

A honeycomb structure 1 according to a second embodiment will now be described with reference to FIGS. 4 and 5. Among reference numerals used in the second and subsequent embodiments, the same reference numerals as in a previous embodiment denote the same or corresponding components as in the previous embodiment, unless otherwise specified.

The honeycomb structure 1 satisfies requirements 1 to 5 described below, as viewed in a cross section perpendicular to the honeycomb central axis 10. Each requirement will now be described.

Requirement 1

The honeycomb structure includes a central area having cell walls with a wall thickness equal to that of the cell walls of the central cell having the cell center through which the honeycomb central axis passes, and a reinforced outer peripheral area having cell walls around the central area that have a wall thickness greater than that of the cell walls of the central cell. Requirement 1 will now be described.

As illustrated in FIG. 1, the honeycomb structure 1 includes a central area 11 and a reinforced outer peripheral area 12. When the cell 2 having the cell center through which the honeycomb central axis 10 passes is defined as a central cell 201, the central area 11 has cell walls 3 with a wall thickness equal to that of the cell walls 3 of the central cell 201. The central cell 201 has four cell walls 3 that divide it from the cells 2 around it. The wall thickness of the cell walls 3 of the central cell 201 is specifically represented as the average of the wall thicknesses of the four cell walls 3 surrounding the central cell 201. The central area 11 basically includes multiple cell walls 3 unthickened compared with the reinforced outer peripheral area 12. Note that in calculating the wall thickness of the cell walls 3 surrounding the central cell 201 in the central area 11, the wall thickness of some thickened cell walls 3 inserted from the reinforced outer peripheral area 12 into the central area 11 is excluded in relation to requirement 5 described later.

The reinforced outer peripheral area 12 has cell walls 3 around the central area 11 that have a wall thickness greater than that of the cell walls 3 of the central cell 201. More specifically, the reinforced outer peripheral area 12 includes multiple cell walls 3 thickened compared with the central area 11. In the present embodiment, as illustrated in FIG. 4, every cell wall 3 in the reinforced outer peripheral area 12 has the same wall thickness. As described later in another embodiment, the reinforced outer peripheral area 12 may include thickened cell walls 3 with different wall thicknesses, as long as requirement 5 described later is satisfied.

Requirement 2

The plurality of cells arranged along over an imaginary perpendicular line passing through the honeycomb central axis and orthogonal to cell walls in a manner to extend through the midpoints of the cell walls include a reference boundary cell having cell walls with different wall thicknesses on the two sides parallel with the imaginary perpendicular line, and with the reference boundary cell including a thin wall that is a thin cell wall on one side parallel with the imaginary perpendicular line and has a wall thickness represented as t1, a thick wall that is a thick cell wall on the other side parallel with the imaginary perpendicular line and has a wall thickness represented as t3, an inner wall that is a cell wall adjacent to the honeycomb center and orthogonal to the imaginary perpendicular line and has a wall thickness represented as t2, and an outer wall that is a cell wall adjacent to the honeycomb periphery and orthogonal to the imaginary perpendicular line and has a wall thickness represented as t4, t1<t3, t2<t4, t1=t2, and t3=t4.

Figure 4:
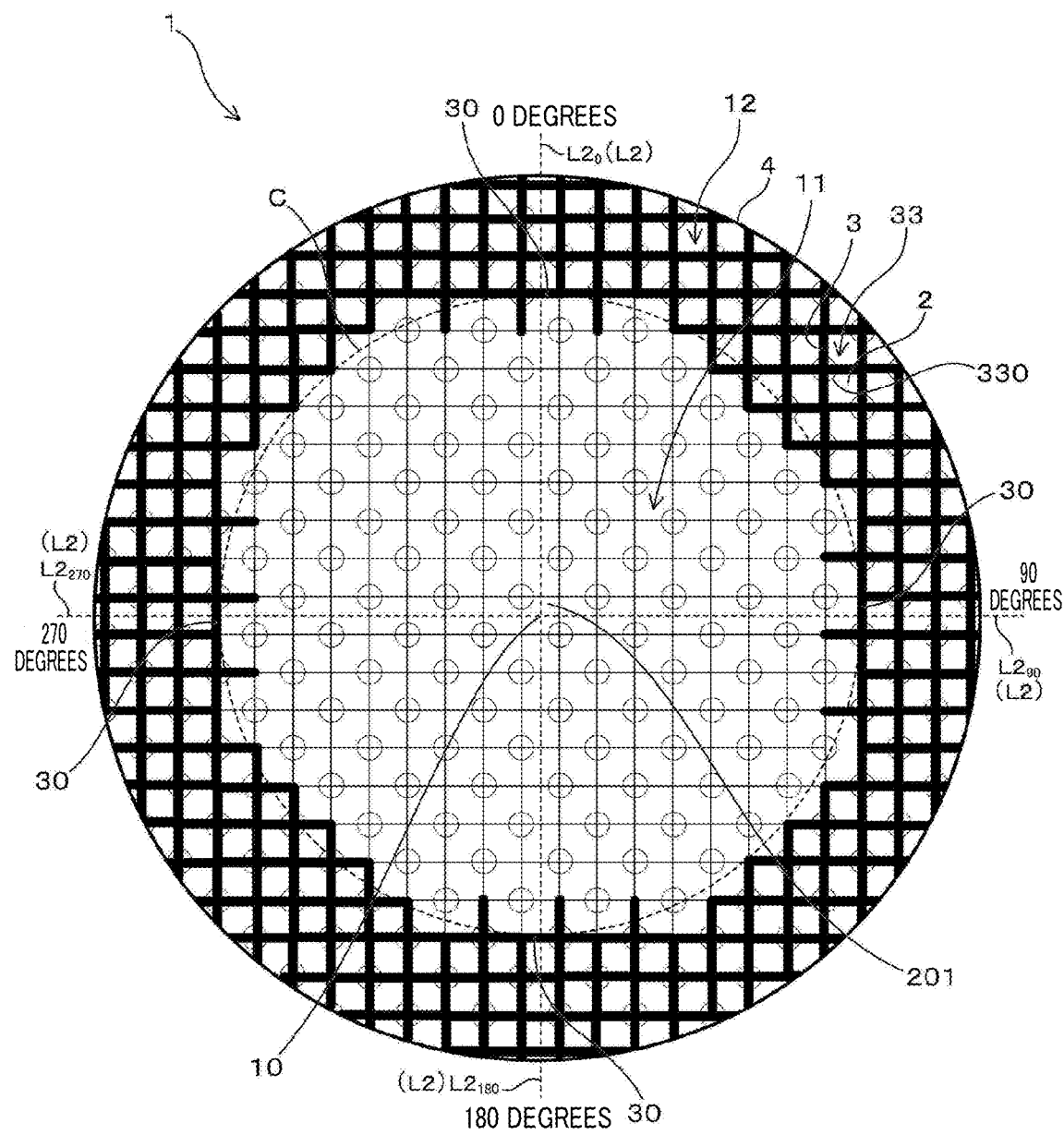
FIG. 4 is a schematic diagram illustrating the cell wall arrangement of a honeycomb structure according to a second embodiment.
Figure 5:
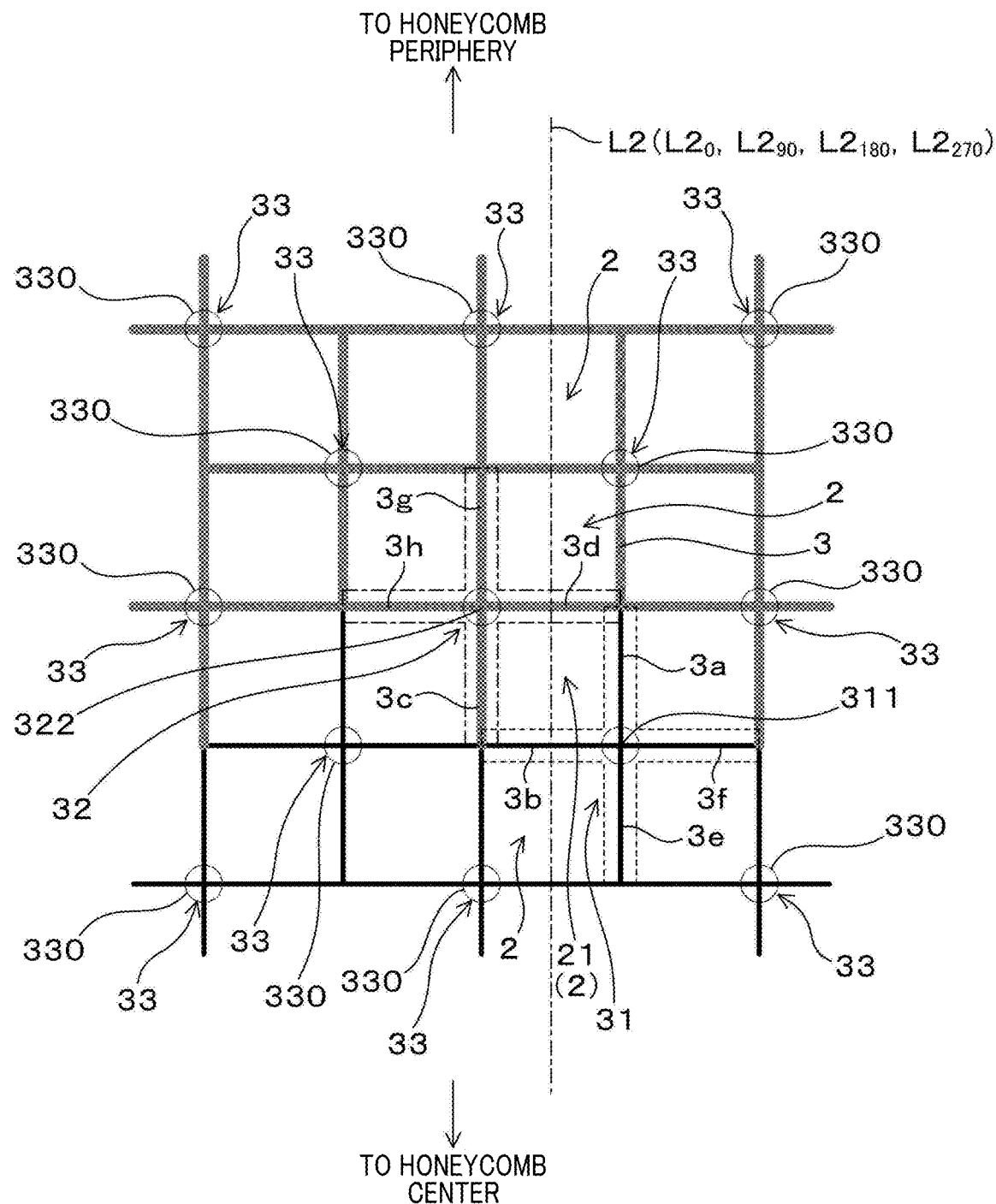
FIG. 5 illustrates the concept of a reference boundary cell, a reference cross-shaped unit, and a cross-shaped unit for a honeycomb structure including a central cell that has the cell center through which the honeycomb central axis passes.

FIG. 4 shows dashed lines $L2_0$, $L2_{90}$, $L2_{180}$, and $L2_{270}$ passing through the honeycomb central axis 10 and orthogonal to cell walls 3 in a manner to extend through the midpoints of the cell walls 3. In FIG. 4, when one dashed line passing through the honeycomb central axis 10 and orthogonal to cell walls 3 (in FIG. 4, the dashed line $L2_0$ in the direction of 12 o'clock) is assumed to extend in the 0-degree direction, the directions of the dashed lines $L2_{90}$, $L2_{180}$, and $L2_{270}$ respectively at 90 degrees, 180 degrees, and 270 degrees clockwise from the dashed line $L2_0$ are the 90-degree direction, the 180-degree direction, and the 270-degree direction. FIG. 5 is an enlarged view of cells 2 and cell walls 3 on and near $L2_0$, $L2_{90}$, $L2_{180}$, or $L2_{270}$ in FIG. 4.

As illustrated in FIG. 4, the dashed lines $L2_0$, $L2_{90}$, $L2_{180}$, and $L2_{270}$ in the four directions of 90 degrees×n (note that n=0, 1, 2, and 3) pass through the honeycomb central axis 10 and are orthogonal to cell walls 3 in a manner to extend through the midpoints of the cell walls 3, and thus each of them is the imaginary perpendicular line L2 in requirement 2. The imaginary perpendicular line L2 is a straight line extending in a honeycomb radial direction through the honeycomb central axis 10. In each of the directions of 90 degrees×n (note that n=0, 1, 2, and 3), when the plurality of cells 2 arranged along the imaginary perpendicular line L2 are seen from the outer peripheral wall 4 toward the honeycomb central axis 10, a cell 2 appears, at a certain site, with cell walls 3 differing in thickness from the adjacent cells 2, as illustrated in FIG. 5. For the cell 2, the cell walls 3 on the two sides parallel with the imaginary perpendicular line L2 have different thicknesses. This cell 2 is a reference boundary cell 21. The remainder of requirement 2 is the same as described in the first embodiment, and will not be described repeatedly. Additionally, requirements 3 to 5 are also basically the same as in the first embodiment, and will not be described repeatedly.

The honeycomb structure 1 according to the first embodiment described above has a cell arrangement with the four surrounding cells 200 around the honeycomb central axis 10. In contrast, the honeycomb structure 1 according to the present embodiment has a cell arrangement with the central cell 201 having the cell center through which the honeycomb central axis 10 passes. In the same manner as the honeycomb structure 1 according to the first embodiment, the honeycomb structure 1 according to the present embodiment, while having the reinforced outer peripheral area 12, is less likely to suffer local distortion during extrusion. Therefore, the honeycomb structure 1 according to the present embodiment avoids a reduction in the structural strength due to distortion and prevents breakage caused by stress concentration during canning. The other configuration and functional effects are the same as in the first embodiment.

The way of counting the number of reinforced cells in the reinforced outer peripheral area 12 of the honeycomb structure 1 according to the present embodiment will be understood by appropriately translating "cells 2 arranged on the imaginary parallel line L1" in the way of counting the number of reinforced cells described in the first embodiment, into "cells 2 arranged along the imaginary perpendicular line L2" in accordance with the present embodiment.

Third Embodiment

A honeycomb structure according to a third embodiment will now be described with reference to FIG. 6.

Figure 6:
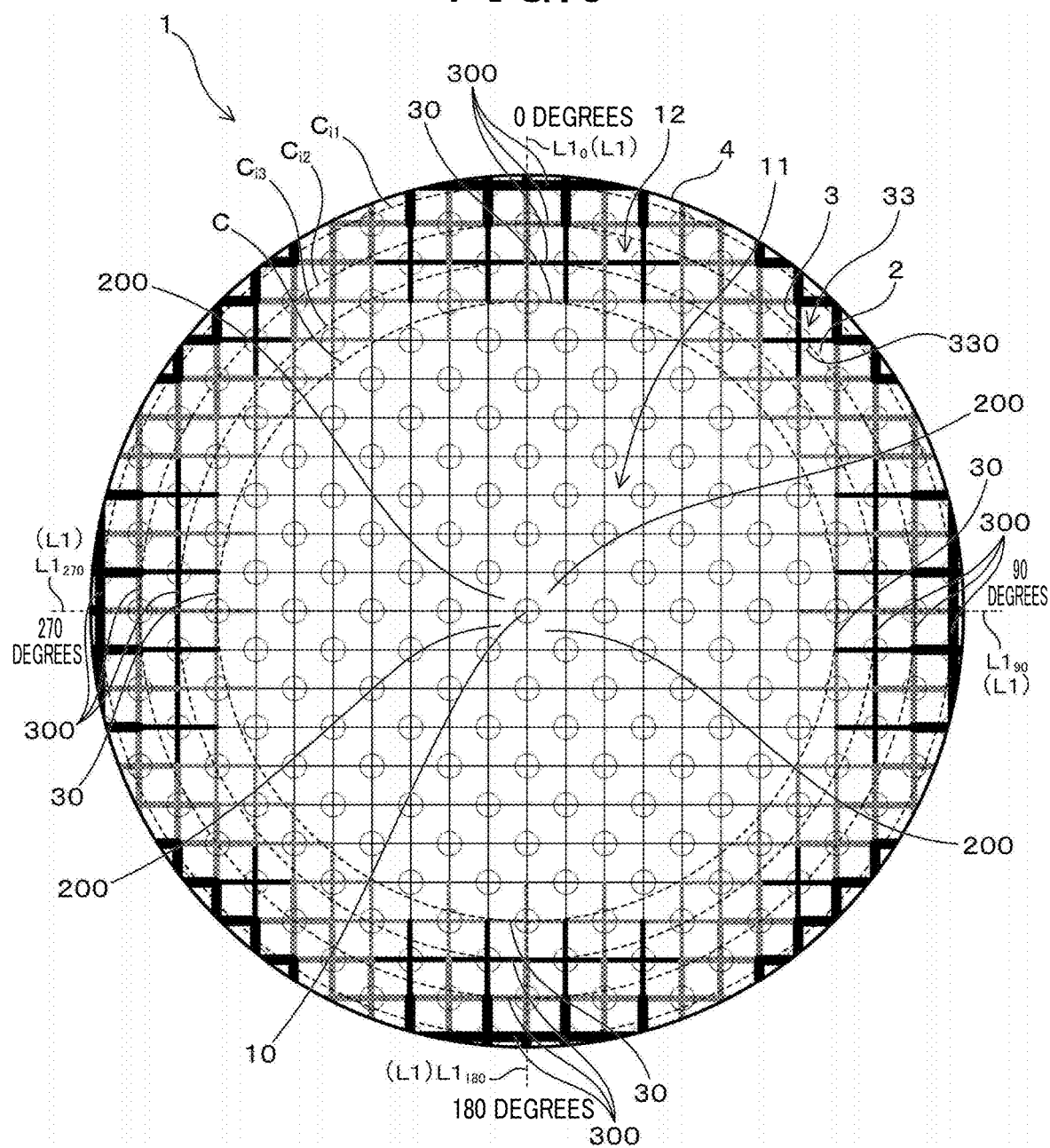
FIG. 6 is a schematic diagram illustrating the cell wall arrangement of a honeycomb structure according to a third embodiment.

As illustrated in FIG. 6, the honeycomb structure 1 according to the present embodiment is an example in which the reinforced outer peripheral area 12 extends to the fourth cell 2 in the direction from the outer peripheral wall 4 to the honeycomb central axis 10. The honeycomb structure 1 according to the present embodiment is similar to the honeycomb structure 1 according to the first embodiment in the reinforced outer peripheral area 12 including four reinforced cells.

However, the honeycomb structure 1 in the present embodiment is different from the honeycomb structure 1 according to the first embodiment in that the wall thickness of the cell walls 3 forming the cells 2 in the reinforced outer peripheral area 12 decreases from the outer peripheral wall 4 toward the honeycomb central axis 10.

More specifically, in the present embodiment, the wall thickness of the cell walls 3 forming the cells 2 in the reinforced outer peripheral area 12 is greatest at the first cell 2 in the direction from the outer peripheral wall 4 to the honeycomb central axis 10, and gradually decreases from the outer peripheral wall 4 toward the honeycomb central axis 10.

This configuration enables the avoidance of an increase in pressure loss and ensures the structural strength of the honeycomb structure 1 compared with a honeycomb structure 1 in which the cells 2 in the reinforced outer peripheral area 12 have cell walls 3 thickened evenly. This is because the configuration allows a gradual decrease in stress toward the honeycomb center and the minimization of influence on pressure loss compared with cases in which the cells 2 in the reinforced outer peripheral area 12 have cell walls 3 thickened evenly.

In the reinforced outer peripheral area 12, the wall thickness of the cell walls 3 forming the X-th cell 2 in the direction from the outer peripheral wall 4 to the honeycomb central axis 10 (note that X is a natural number not less than two and not more than the number of reinforced cells in the reinforced outer peripheral area) is the average wall thickness measurement of the cell walls 3 forming the X-th cells 2 in the directions of 90 degrees×n (note that n=0, 1, 2, and 3).

In the present embodiment, specifically, the reinforced outer peripheral area 12 includes a plurality of concentric areas about the honeycomb central axis 10, and the cell walls 3 in different concentric areas have different wall thicknesses. The following describes an example of the reinforced outer peripheral area 12 in which the area including the X-th cell 2 from the outer peripheral wall 4 has cell walls 3 with wall thicknesses different from those of the area including the previous (X−1)-th cell 2.

Basically, the way of counting the number of reinforced cells in the reinforced outer peripheral area 12 described in the first embodiment may be used for the plurality of cells 2 arranged on the imaginary parallel line L1 in each of the directions of 90 degrees×n (note that n=0, 1, 2, and 3). More specifically, in the above example, the X-th cell 2 and the (X−1)-th cell 2 have a boundary cell wall 3 between them, which is referred to as an inner boundary wall 300. The inner boundary wall 300 is divided into two equal parts in the wall thickness direction by a bisector (not shown), and an imaginary circle Ci touching the bisector is drawn. The imaginary circle Ci is a concentric circle with its center coinciding with the honeycomb central axis 10. The cell walls 3 of the cross-shaped units 33 with their cell vertexes 330 on the imaginary circle Ci and outside the imaginary circle Ci are thickened to be greater in thickness than the cell walls 3 of the cross-shaped units 33 with their cell vertexes 330 inside the imaginary circle Ci. Thus, in the reinforced outer peripheral area 12, the area including the (X−1)-th cell from the outer peripheral wall 4 may have cell walls 3 thicker than the cell walls 3 of the area including the X-th cell 2 from the outer peripheral wall 4.

In the reinforced outer peripheral area 12 of the honeycomb structure 1 illustrated as an example in FIG. 6, the wall thickness of the cell walls 3 in the area including the fourth cell 2 from the outer peripheral wall 4<the wall thickness of the cell walls 3 in the area including the third cell 2 from the outer peripheral wall 4<the wall thickness of the cell walls 3 in the area including the second cell 2 from the outer peripheral wall 4<the wall thickness of the cell walls 3 in the area including the first cell 2 from the outer peripheral wall 4.

In the honeycomb structure 1 illustrated in FIG. 6, an imaginary circle $Ci_1$ drawn in the reinforced outer peripheral area 12 is a boundary circle that forms the boundary between the first-cell area and the second-cell area. Similarly, an imaginary circle $Ci_2$ drawn in the reinforced outer peripheral area 12 is a boundary circle that forms the boundary between the second-cell area and the third-cell area. An imaginary circle $Ci_3$ drawn in the reinforced outer peripheral area 12 is a boundary circle that forms the boundary between the third-cell area and the fourth-cell area. All cross-shaped units 33 with their cell vertexes 330 between the outer peripheral wall 4 and the imaginary circle $Ci_1$ have cell walls 3 with an equal wall thickness. Similarly, all cross-shaped units 33 with their cell vertexes 330 between the imaginary circle $Ci_1$ and the imaginary circle $Ci_2$ have cell walls 3 with an equal wall thickness. All cross-shaped units 33 with their cell vertexes 330 between the imaginary circle $Ci_2$ and the imaginary circle $Ci_3$ have cell walls 3 with an equal wall thickness. All cross-shaped units 33 with their cell vertexes between the imaginary circle $Ci_3$ and the imaginary circle C have cell walls 3 with an equal wall thickness.

In the present embodiment, the cell walls 3 included in the reinforced outer peripheral area 12 and forming the first cell 2 in the direction from the outer peripheral wall 4 to the honeycomb central axis 10 may be 1.4 or more times and preferably 1.5 or more times as thick as the cell walls 3 that form the surrounding cells 200 in the central area 11.

This configuration facilitates reducing stress in the first-cell area, which suffers the highest stress concentration during canning. Thus, the configuration has an advantage in ease of improvement in the structural strength of the honeycomb structure 1.

The wall thickness of the cell walls 3 forming the surrounding cells 200 in the central area 11 is the average wall thickness measurement of the cell walls 3 forming the surrounding cells 200. The other configuration and functional effects are the same as in the first embodiment.

Fourth Embodiment

A honeycomb structure according to a fourth embodiment will now be described with reference to FIG. 7.

Figure 7:
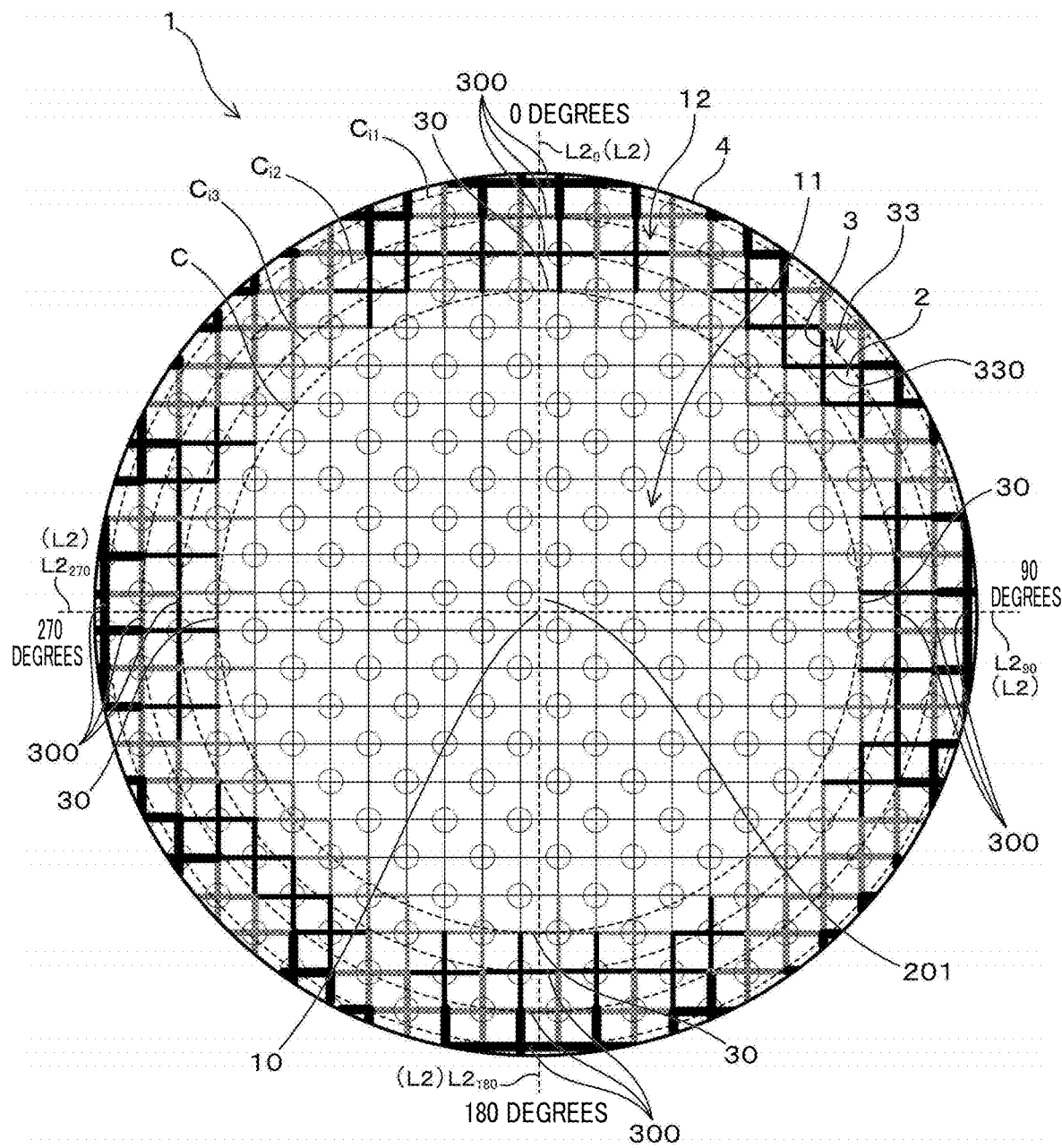
FIG. 7 is a schematic diagram illustrating the cell wall arrangement of a honeycomb structure according to a fourth embodiment.

As illustrated in FIG. 7, the honeycomb structure 1 according to the present embodiment is an example with a central cell 201 having the cell center through which the honeycomb central axis 10 passes. Also in the present embodiment, basically, the way of counting the number of reinforced cells in the reinforced outer peripheral area 12 may be similarly used for the plurality of cells 2 arranged along the imaginary perpendicular line L2 in each of the directions of 90 degrees×n (note that n=0, 1, 2, and 3) in accordance with the third embodiment.

The honeycomb structure 1 according to the present embodiment is an example in which the reinforced outer peripheral area 12 extends to the fourth cell 2 in the direction from the outer peripheral wall 4 to the honeycomb central axis 10, and the reinforced outer peripheral area 12 includes four reinforced cells. In the reinforced outer peripheral area 12 of the honeycomb structure 1, the wall thickness of the cell walls 3 of the area including the fourth cell 2 from the outer peripheral wall 4<the wall thickness of the cell walls 3 of the area including the third cell 2 from the outer peripheral wall 4<the wall thickness of the cell walls 3 of the area including the second cell 2 from the outer peripheral wall 4<the wall thickness of the cell walls 3 of the area including the first cell 2 from the outer peripheral wall 4.

In the present embodiment, the cell walls 3 included in the reinforced outer peripheral area 12 and forming the first cells 2 in the direction from the outer peripheral wall 4 to the honeycomb central axis 10 may be 1.4 or more times and preferably 1.5 or more times as thick as the cell walls 3 that form the central cell 201 in the central area 11.

This configuration facilitates reducing stress in the first-cell area, which suffers the highest stress concentration during canning. Thus, the configuration has an advantage in ease of improvement in the structural strength of the honeycomb structure 1.

The wall thickness of the cell walls 3 forming the central cell 201 in the central area 11 is the average wall thickness measurement of the cell walls 3 forming the central cell 201. The other configuration and functional effects are the same as in the third embodiment.

Fifth Embodiment

A honeycomb structure according to a fifth embodiment will now be described with reference to FIG. 8.

Figure 8:
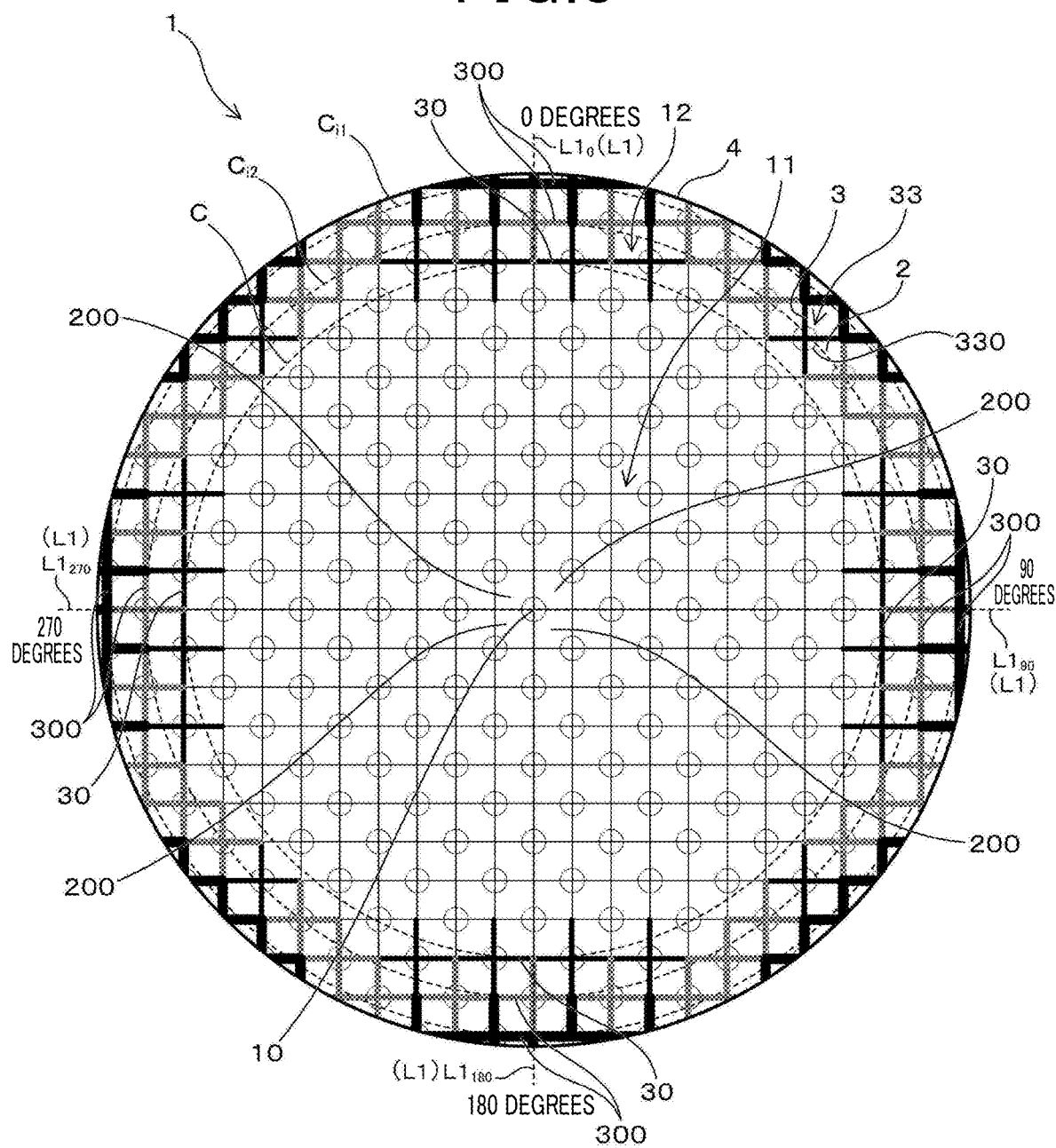
FIG. 8 is a schematic diagram illustrating the cell wall arrangement of a honeycomb structure according to a fifth embodiment.

As illustrated in FIG. 8, the honeycomb structure 1 according to the present embodiment is an example in which the reinforced outer peripheral area 12 is an area ranging from the outer peripheral wall 4 to the third cell 2 in the direction toward the honeycomb central axis 10, and the reinforced outer peripheral area 12 includes three reinforced cells. In the reinforced outer peripheral area 12 of the honeycomb structure 1, the wall thickness of the cell walls 3 of the area including the third cell 2 from the outer peripheral wall 4<the wall thickness of the cell walls 3 of the area including the second cell 2 from the outer peripheral wall 4<the wall thickness of the cell walls 3 of the area including the first cell 2 from the outer peripheral wall 4. The other configuration and functional effects are the same as in the third embodiment.

Sixth Embodiment

A die 5 according to a sixth embodiment will now be described with reference to FIGS. 9 to 11. The die 5 according to the present embodiment is a die for extruding a honeycomb structure 1 including a plurality of cells 2 adjacent to each other and quadrangular in cross section, a plurality of cell walls 3 forming the plurality of cells 2, and an outer peripheral wall 4 provided outside the plurality of cell walls 3 and holding the cell walls 3. For the parts of the honeycomb structure 1, reference may be made to the above-described first to fifth embodiments as needed.

Figure 9:
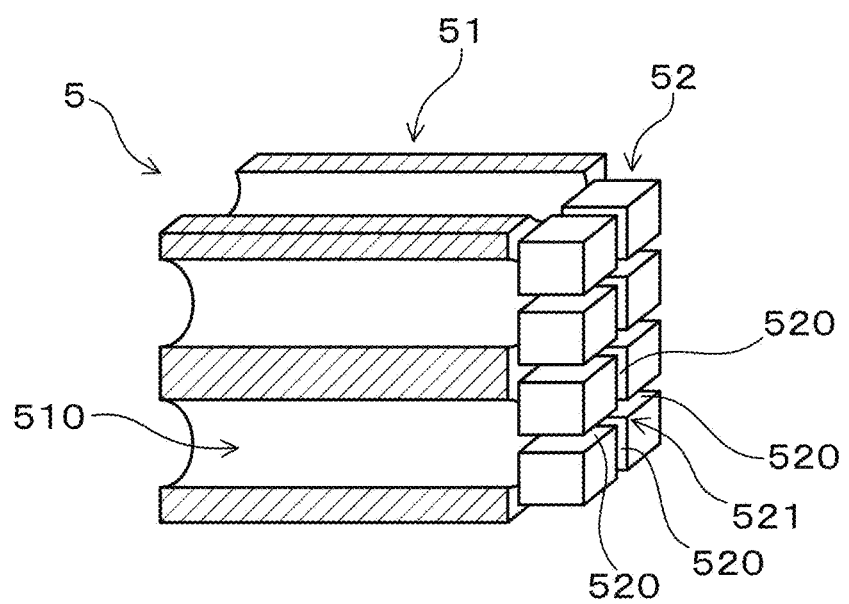
FIG. 9 is a schematic diagram illustrating a part of a die according to a sixth embodiment.
Figure 10:
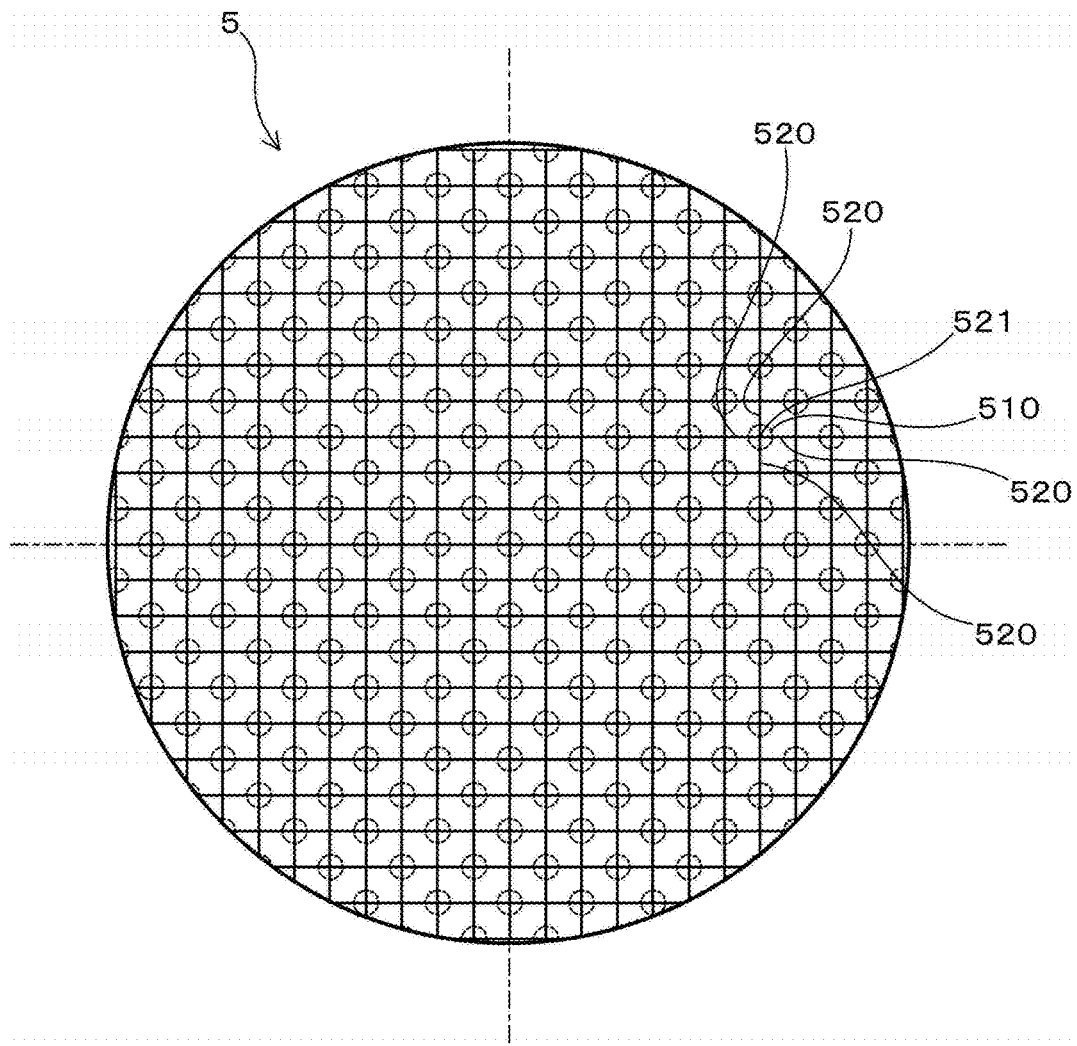
FIG. 10 is a diagram for illustrating the positional relationship between green body inlets and slit vertexes in the die according to the sixth embodiment.
Figure 11:
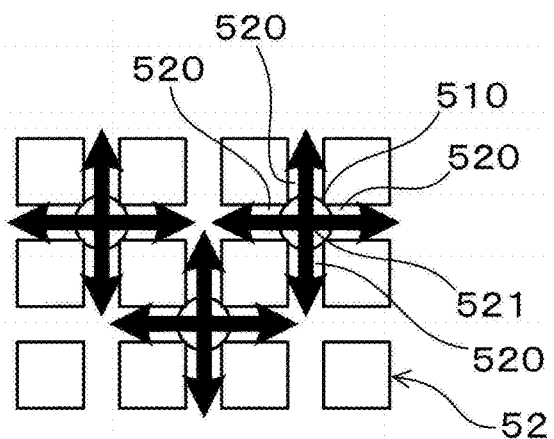
FIG. 11 is a schematic diagram illustrating the flow pattern of a green body fed from green body inlets to slit vertexes in the die according to the sixth embodiment.

As illustrated in FIGS. 9 to 11, the die 5 according to the present embodiment includes a first die portion 51 and a second die portion 52. The first die portion 51 includes a plurality of green body inlets 510 through which a green body is fed as a raw material for the honeycomb structure 1. In the present embodiment, the green body inlets 510 are cylindrical through-holes. The green body is typically a clayey substance prepared from the raw material for the cell walls 3 of the honeycomb structure 1.

The second die portion 52 includes a plurality of slits 520 for receiving the green body fed through the green body inlets 510 to form a portion as the plurality of cell walls 3 in the honeycomb structure 1. The second die portion 52 also includes a central slit area (not shown) and a peripheral slit area (not shown). The central slit area is a part for forming a portion as cell walls 3 with a wall thickness equal to that of the cell walls 3 of the four surrounding cells 200 around the honeycomb central axis 10 or the cell walls 3 of the central cell 20 having the cell center through which the honeycomb central axis 10 passes. That is, the central slit area is a part for forming the central area 11 of the honeycomb structure 1. The peripheral slit area is a part having slits 520 around the central slit area that are wider than the slits 520 of the central slit area. That is, the peripheral slit area is a part for forming the reinforced outer peripheral area 12 of the honeycomb structure 1.

FIG. 10 illustrates the positional relationship between the green body inlets 510 and slit vertexes 521. FIG. 10 is an illustration of the die 5 that forms the honeycomb structure 1 including the four surrounding cells 200 around the honeycomb central axis 10. In FIG. 10, the slits 520 are represented as lines for convenience. In FIG. 10, differences in width among the slits 520, and the central slit area and the peripheral slit area are omitted. As illustrated in FIG. 10, the green body inlets 510 of the first die portion 51 in the die 5 are positioned at not all the slit vertexes 521 each corresponding to the slit connection between four slits 520 of the second die portion 52. The green body inlets 510 of the first die portion 51 are positioned at alternate slit vertexes 521 along the slits 520 of the second die portion 52.

The die 5 has the configuration described above. Thus, when the honeycomb structure 1 is extruded through the die 5, the green body may be fed to not all slit vertexes 521 corresponding to the slit connections each between four slits 520. As shown in FIG. 10, the green body may be fed to each of the alternate slit vertexes 521 along the slits 520 from the one corresponding green body inlet 510, and as shown in FIG. 11, the green body may be spread from the slit vertex 521 evenly into the four slits 520 with an equal width. More specifically, the die 5, in which the four slits 520 extending radially from the slit vertex 521 adjacent to each green body inlet 510 have a substantially equal width, allows reduction in the variance of resistance to the green body flow among the four slits 520. Accordingly, the die 5 reduces the possibility of the occurrence of a local distortion during the extrusion of the reinforced outer peripheral area 12 of the honeycomb structure 1.

Therefore, the die 5 can form the honeycomb structure 1 capable of avoiding a reduction in the structural strength due to distortion. The honeycomb structures 1 illustrated in the first to the fifth embodiments can be specifically formed, for example, in the manner described below.

A die 5 is prepared that includes a second die portion 52 with the slit widths and the slit arrangement corresponding to the wall thicknesses and the cell wall arrangement of the multiple cell walls 3 of each honeycomb structure 1, and a first die portion 51 having green body inlets 510 arranged with their hole centers coinciding with alternate slit vertexes 521 in the second die portion 52. The arrangement of the green body inlets 510 in the first die portion 51 of the die 5 corresponds to the arrangement of the cell vertexes 330 (circles indicated in FIGS. 1, 4, and 6 to 8) of the cross-shaped units 33 in the honeycomb structure 1 to be formed. Then, in the extrusion step, the green body inlets 510 are fed with a green body, and the green body is fed to the slit vertexes 521. As a result, the green body fed to each slit vertex 521 is spread into the four slits 520 extending radially from the slit vertex 521. In addition, the green body spread in the slits 520 combines with a green body similarly fed from the adjacent green body inlets 510 to their slit vertexes 521 and spread in the slits 520, and the resultant article is extruded from the die 5. After the extrusion, known steps may be used. In this manner, the honeycomb structures 1 illustrated in the first to the fifth embodiments can be manufactured.

The die 5 may have a width difference ratio of 10% or less, which is calculated in accordance with the formula: 100×(wmax−wmin)/wmax, where wmax denotes the maximum width and w min denotes the minimum width of the four slits 520 extending radially from each of the slit vertexes 521 at the green body inlets 510.

When each cross-shaped unit 33 of the honeycomb structure 1 is formed, the above configuration facilitates reducing the variance of resistance to the green body flow among the four slits 520 extending from the slit vertex 521, and reduces the possibility of the occurrence of shape defect such as unconnected cell walls 3 between adjacent cross-shaped units 33. Thus, the above configuration enables the production of the honeycomb structure 1 with sufficient average isostatic strength and minimum isostatic strength even though the materials may vary. The above configuration also enables the production of the honeycomb structure 1 effective at reducing the defective rate related to distortions.

To ensure the structural strength of the extruded honeycomb structure 1, the width difference ratio may be preferably less than 10%, more preferably 9% or less, yet more preferably 8% or less, still more preferably 7% or less, and yet still more preferably 6% or less. The width difference ratio may be even yet still more preferably 5% or less in terms of easy production of the honeycomb structure 1 that has the above wall thickness difference ratio of 5% or less.

Figure 12:
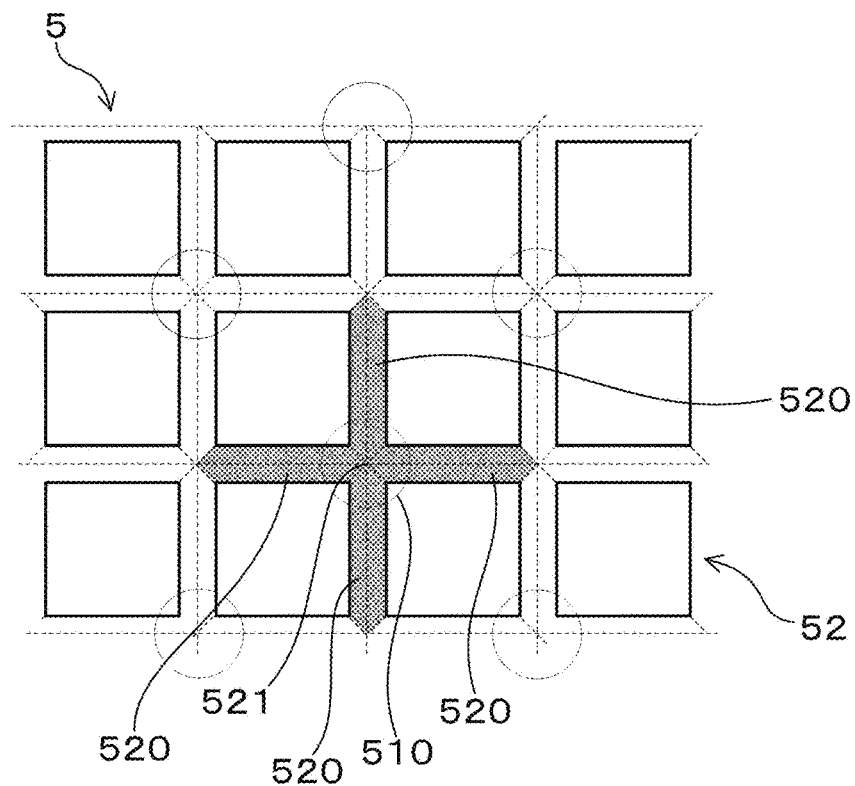
FIG. 12 is a diagram for illustrating a feed ratio in the die according to the sixth embodiment.

In the die 5, the green body inlets 510 may have a hole diameter defined to achieve a constant feed ratio. This configuration facilitates feeding the green body evenly from each green body inlet 510 to the slits 520. The configuration thus provides the die 5 that easily produces a honeycomb structure 1 with each cross-shaped unit 33 having cell walls 3 with an equal wall thickness. The feed ratio, as shown in FIG. 12, is calculated by dividing the cross-sectional area of the four slits 520 extending radially from a slit vertex 521 by the cross-sectional area of the green body inlet 510. The cross section is perpendicular to the hole axis of the green body inlet 510.

The die 5 preferably satisfies the relation: the hole diameter of the green body inlets 510 connecting to the central slit area<the hole diameter of the green body inlets 510 connecting to the peripheral slit area. In this configuration, the amount of a green body to be fed increases with the width of thickened slits 520, and thus correspondingly increasing the diameter of the feeding holes allows effective acquisition of an extruded article with a cell wall thickness difference corresponding to the slit width difference.

Experimental Example 1

As shown in Table 1, samples of honeycomb structures were prepared with their reinforced outer peripheral areas having different numbers of reinforced cells and cell walls with different wall thicknesses, and their isostatic strengths were measured (the average of n=20; the same applies hereinafter). In this experimental example, honeycomb structures were prepared each having four surrounding cells around the honeycomb central axis.

Figure 18:
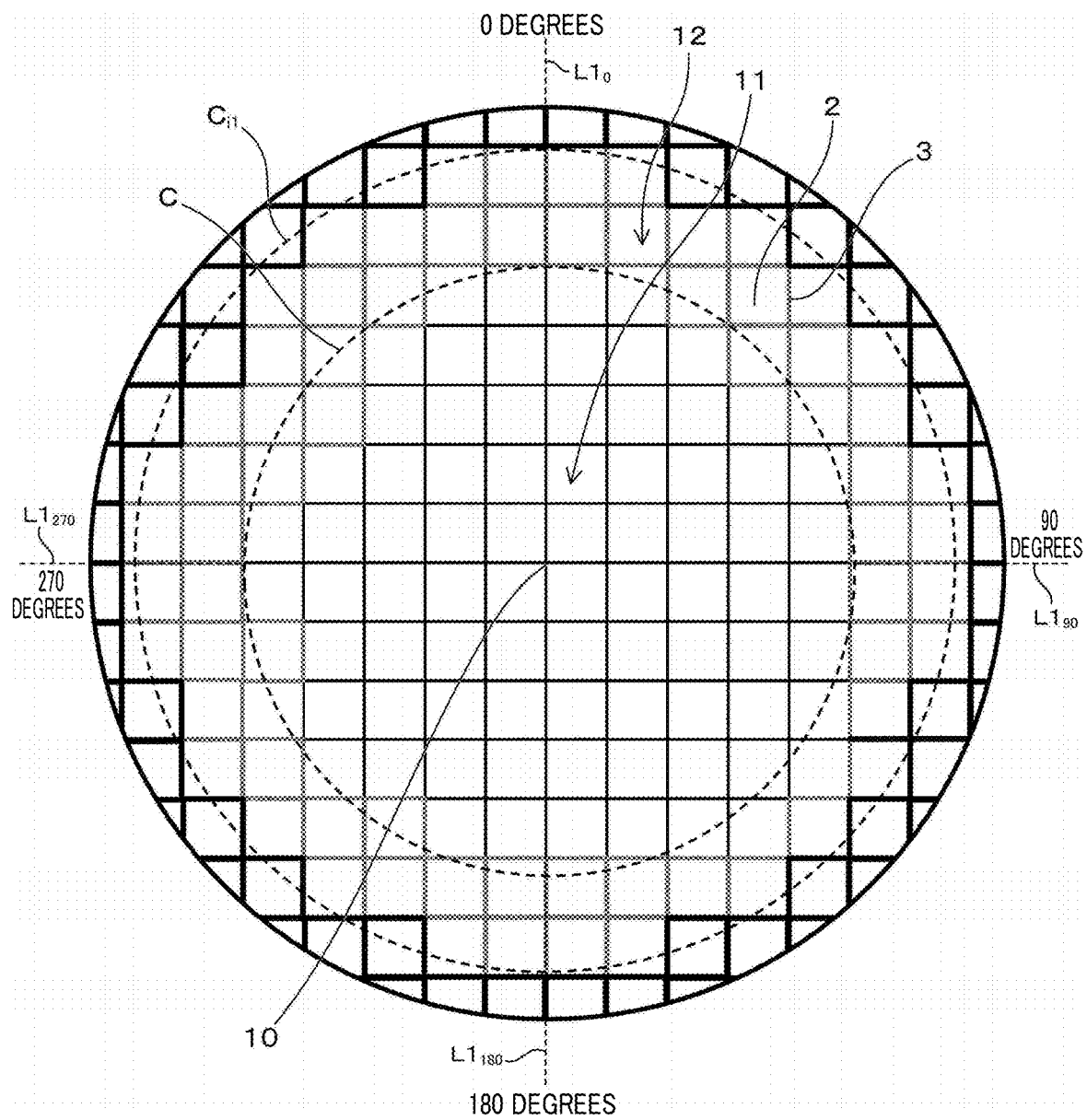
FIG. 18 is a schematic diagram illustrating the cell wall arrangement of a conventional honeycomb structure that is sample 1 in Experimental Example 1.

More specifically, as illustrated in FIG. 6, sample 3 has a central area and a reinforced outer peripheral area in which the cell walls of each of all the cross-shaped units have a substantially equal wall thickness, and satisfies requirement 5. Sample 4 is basically the same as sample 3 although having a different number of reinforced cells from sample 3. In contrast, samples 1 and 2 do not satisfy requirement 5. More specifically, sample 1 is a conventional honeycomb structure, and as shown in FIG. 18, includes a part in which at least one of the four cell walls extending radially from each cell vertex has a wall thickness different from that of the remaining cell walls. Although not shown, sample 2 is similar to sample 1.

The details will now be described using samples 1 and 3 as representatives. In this experimental example, the honeycomb structure of each sample had an outer peripheral wall with a thickness of 0.35 mm and an outer shape with a diameter of 117 mm and a height of 100 mm. The slits of the die were as follows:

Slit width in central slit area: 70 μm, slit pitch: 1.19 mm, radius dimension of slit vertex: 0.1 mm Slit width for first cell in peripheral slit area: 117 μm, slit pitch: 1.19 mm, radius dimension of slit vertex: 0.1 mm Slit width for second cell in peripheral slit area: 103 μm, slit pitch: 1.19 mm, radius dimension of slit vertex: 0.1 mm Slit width for third cell in peripheral slit area: 90 μm, slit pitch: 1.19 mm, radius dimension of slit vertex: 0.1 mm Slit width for fourth cell in peripheral slit area: 77 μm, slit pitch: 1.19 mm, radius dimension of slit vertex: 0.1 mm Through the above-described die, a honeycomb structure was extruded with the cell walls described below.

Wall thickness of cell walls in central area: 65 μm, cell wall pitch: 1.1 mm, radius dimension of cell vertex: 0.15 mm Wall thickness of cell wall of first cell in reinforced outer peripheral area: 112 μm, cell wall pitch: 1.1 mm, radius dimension of cell vertex: 0.15 mm Wall thickness of cell wall of second cell in reinforced outer peripheral area: 98 μm, cell wall pitch: 1.1 mm, radius dimension of cell vertex: 0.15 mm Wall thickness of cell wall of third cell in reinforced outer peripheral area: 85 μm, cell wall pitch: 1.1 mm, radius dimension of cell vertex: 0.15 mm Wall thickness of cell wall of fourth cell in reinforced outer peripheral area: 72 μm, cell wall pitch: 1.1 mm, radius dimension of cell vertex: 0.15 mm

TABLE 1

| Sample No. | Satisfaction of requirement 5 | Wall thickness of cell walls of reinforced outer peripheral area (μm) | | | | | | Isostatic strength (MPa) | Maximum isostatic strength (MPa) | Minimum isostatic strength (MPa) |
|---|---|---|---|---|---|---|---|---|---|---|
| | | 1st cell | 2nd cell | 3rd cell | 4th cell | 5th cell | 6th cell | | | |
| 1 | Unsatisfied | 112 | 98 | 85 | 72 | — | — | 0.70 | 0.92 | 0.54 |
| 2 | Unsatisfied | 112 | 100 | 90 | 79 | 74 | 72 | 0.74 | 1.08 | 0.37 |
| 3 | Satisfied | 112 | 98 | 85 | 72 | — | — | 4.2 | 5.6 | 3.7 |
| 4 | Satisfied | 112 | 100 | 90 | 79 | 74 | 72 | 5.1 | 6.5 | 4.2 |

Table 1 shows the following. Samples 1 and 2 had low isostatic strengths. In an examination as to the cause, samples 1 and 2 were found to have distortion such as a thin cell wall site or a green body shortage on their outer peripheries. Then, a cell wall crack was observed at the site of the distortion. This is because the cell wall arrangements of samples 1 and 2 inevitably caused, at some site, a green body to be fed from one green body inlet in the die into a plurality of slits with different widths, resulting in an uneven flow of the green body in narrow slits having a high resistance to the flow of the green body.

In contrast, samples 3 and 4 had isostatic strengths higher than samples 1 and 2. This is because samples 3 and 4 included cross-shaped units each having cell walls with an equal wall thickness, and in the formation of each cross-shaped unit, the equal wall thickness reduced the variance of resistance to the green body flow among the four slits extending from the slit vertex, resulting in a lower possibility of the occurrence of a local distortion.

Experimental Example 2

As shown in Table 2, samples were prepared in the same manner as sample 3 in Experimental Example 1 with different wall thickness difference ratios in their cross-shaped units, and their isostatic strengths were measured.

The wall thickness difference was measured using a CNC image processing apparatus, QV-H4A, manufactured by Mitutoyo Corporation. Light was transmitted through the samples, which were then observed with a camera, and the wall thicknesses of all the cell walls were automatically measured. This apparatus can determine an abnormal measured value resulting from distortion and identify distortion through an image. For the site of distortion, the apparatus determines the wall thickness of the cell wall to be 0 as an error in measurement.

and minimum isostatic strengths. The results reveal that, even when wall thicknesses differ, a wall thickness difference ratio of 5% or less can lower the possibility of the formation of a cross-shaped unit having distortion that may reduce the structural strength of the honeycomb structure.

Samples 7 and 8 had reductions in the minimum isostatic strength although their maximum isostatic strengths changed little. When an image of sample 8 yet to be broken was seen, cell wall chipping was found in some cross-shaped units with a wall thickness difference ratio of 10%. The results indicate that the likelihood of cell wall chipping will increase as the wall thickness difference ratio approaches 10%. Furthermore, as the wall thickness difference ratio decreases, ensuring the isostatic strength becomes easier. This is because a decrease in distortions reduces samples that have a low isostatic strength.

In contrast, with a wall thickness difference ratio greater than 10% like sample 9, distortions were found in all the workpieces (n=20), and every workpiece had a low isostatic strength.

Experimental Example 3

As shown in Table 3, samples were prepared in the same manner as sample 3 in Experimental Example 1 with different numbers of reinforced cells in their reinforced outer peripheral areas, and their isostatic strengths and pressure loss were measured.

Figure 13:
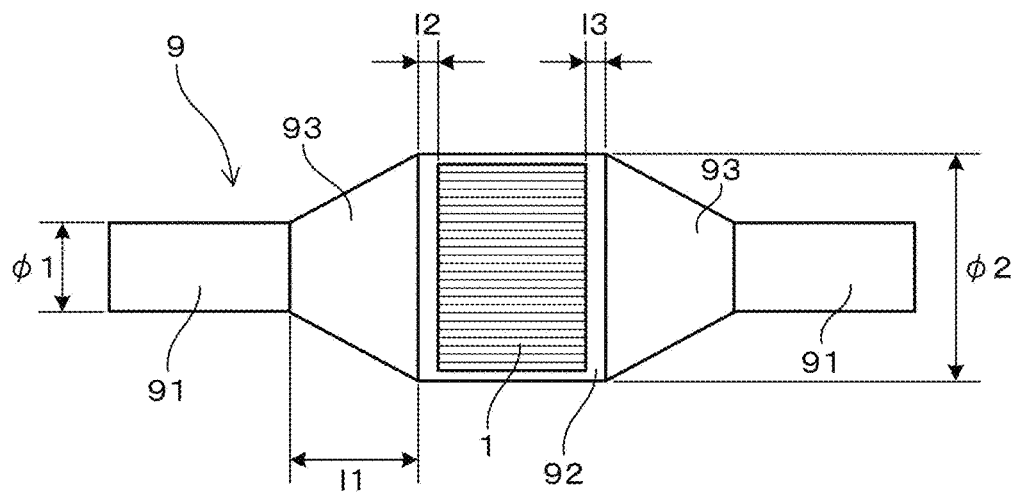
FIG. 13 is a diagram for illustrating a method for evaluating pressure loss in Experimental Example 3.

The pressure loss was measured in the manner described below. As schematically shown in FIG. 13, an evaluation converter 9 was prepared with pipe portions 91, an accommodation portion 92 housing a honeycomb structure 1, and tapered portions 93 connecting the pipe portions 91 and the accommodation portion 92. The pipe portions 91 had a diameter φ1 of 50.5 mm. The accommodation portion 92 had a diameter φ2 of 123 mm. The tapered portions 93 had

TABLE 2

| Sample No. | Satisfaction of requirement 5 | Wall thickness difference ratio (%) | Wall thickness of cell walls of reinforced outer peripheral area (μm) | | | | Isostatic strength (MPa) | Maximum isostatic strength (MPa) | Minimum isostatic strength (MPa) |
|---|---|---|---|---|---|---|---|---|---|
| | | | 1st cell | 2nd cell | 3rd cell | 4th cell | | | |
| 5 | Satisfied | ≤2% | 112 | 98 | 85 | 72 | 4.2 | 5.6 | 3.7 |
| 6 | Satisfied | >2%, ≤5% | 112 | 98 | 85 | 72 | 4.2 | 6.0 | 3.1 |
| 7 | Satisfied | >5%, ≤7% | 112 | 98 | 85 | 72 | 3.0 | 5.4 | 1.11 |
| 8 | Satisfied | >7%, ≤10% | 112 | 98 | 85 | 72 | 3.2 | 5.7 | 1.04 |
| 9 | Satisfied | >10%, ≤12% | 112 | 98 | 85 | 72 | 0.93 | 1.64 | 0.41 |

Table 2 shows the following. Samples 5 and 6 had no reduction in the isostatic strength (average), and demonstrated comparable levels of maximum isostatic strengths a length l1 of 55 mm. One end surface of the honeycomb structure 1 and the tapered portion 93 adjacent to this end surface had a distance l2 of 5 mm between them. The other end surface of the honeycomb structure 1 and the tapered portion 93 adjacent to this end surface had a distance 13 of 10 mm between them. The honeycomb structure 1 received exhaust gas flowing at a flow rate of 7 m³/min and having a gas temperature of 600° C. The exhaust gas was generated using a 4.6L V8 engine.

TABLE 3

| Sample No. | Satisfaction of requirement 5 | Reinforced outer peripheral area | | Isostatic strength (MPa) | Pressure loss (kPa) |
|---|---|---|---|---|---|
| | | Number of reinforced cells (cells) | Wall thickness of cell wall (μm) | | |
| 10 | Satisfied | 0  | 75 | 1.6 | 4.97 |
| 11 | Satisfied | 2  | 75 | 1.4 | 5.07 |
| 12 | Satisfied | 4  | 75 | 2.6 | 5.12 |
| 13 | Satisfied | 6  | 75 | 2.5 | 5.17 |
| 14 | Satisfied | 8  | 75 | 3.2 | 5.19 |
| 15 | Satisfied | 10 | 75 | 3.7 | 5.20 |
| 16 | Satisfied | 18 | 75 | 3.8 | 5.22 |
| 17 | Satisfied | 20 | 75 | 3.9 | 5.22 |
| 18 | Satisfied | 22 | 75 | 3.7 | 5.32 |
| 19 | Satisfied | 25 | 75 | 4.1 | 5.62 |
| 20 | Satisfied | 30 | 75 | 3.7 | 6.16 |

Figure 14:
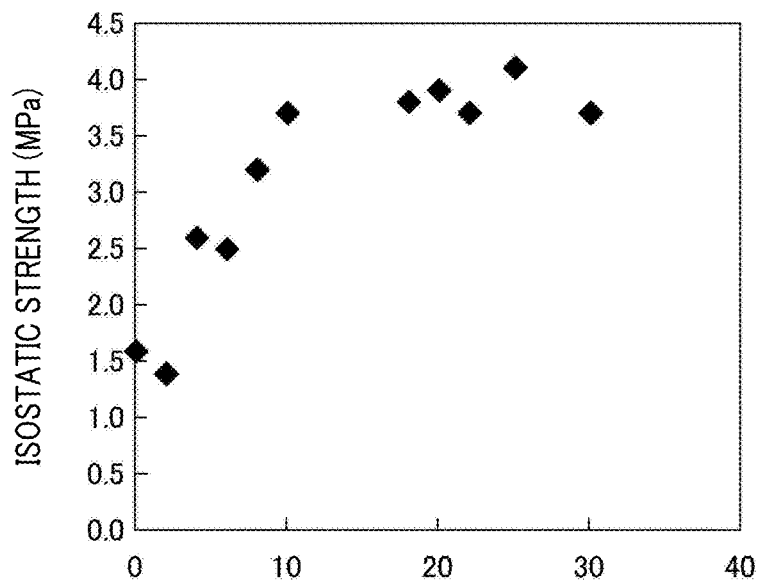
FIG. 14 is a graph showing the relationship between the isostatic strength and the number of reinforced cells in the reinforced outer peripheral area in Experimental Example 3.
Figure 15:
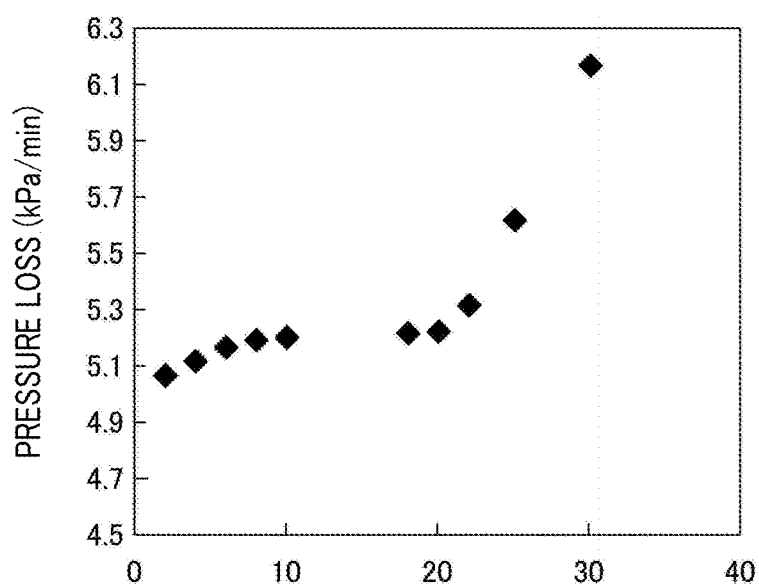
FIG. 15 is a graph showing the relationship between the pressure loss and the number of reinforced cells in the reinforced outer peripheral area in Experimental Example 3.
Figure 16:
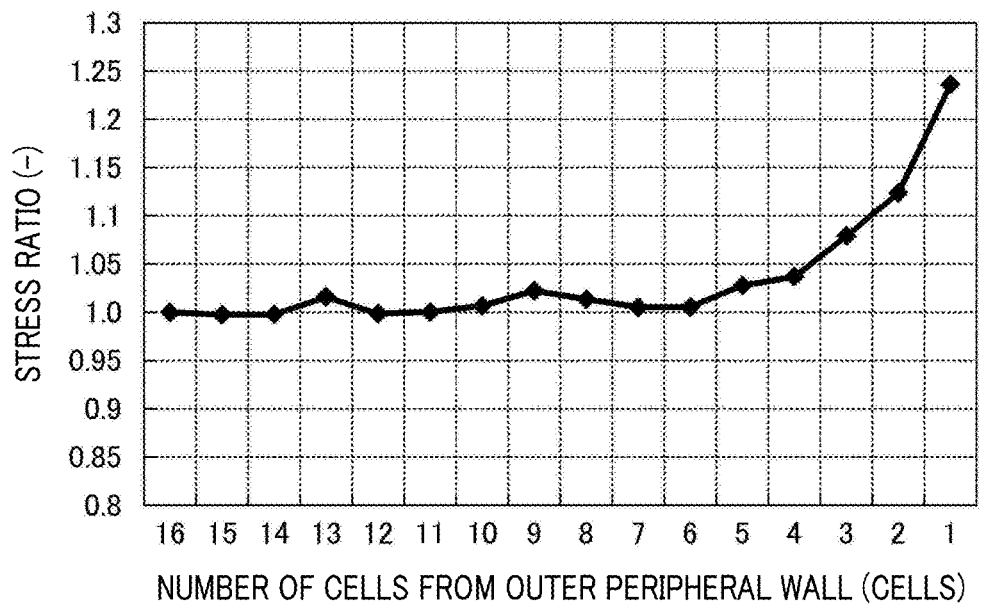
FIG. 16 is a graph showing the relationship between the stress ratio and the number of cells from the outer peripheral wall of a honeycomb structure according to CAE analysis in Experimental Example 3.

Table 3 and FIGS. 14 to 16 show the following. Table 3 and FIGS. 14 and 15 indicate that when the reinforced outer peripheral area is an area ranging from the outer peripheral wall to the fourth or any subsequent cell in the direction toward the honeycomb central axis, or the reinforced outer peripheral area has four or more reinforced cells, the isostatic strength can be improved more easily than a honeycomb structure with its reinforced outer peripheral area having less than four reinforced cells. FIG. 16 shows the relationship between the stress ratio and the number of cells from the outer peripheral wall of a honeycomb structure according to CAE analysis. FIG. 16 indicates that the stress generated in a honeycomb structure having cells quadrangular in cross section increases toward the outer periphery. In particular, it is found that the stress generated increases sharply within the area ranging from the outer peripheral wall to the fourth cell in the direction toward the honeycomb central axis. The results also indicate that the reinforced outer peripheral area having four or more reinforced cells enables effective prevention of breakage caused by stress concentration during canning and has an advantage in ease of improvement in the structural strength of the honeycomb structure.

In contrast, Table 3 and FIG. 15 indicate that reinforced outer peripheral areas having more than 20 reinforced cells exhibited a tendency toward a sharp increase in the pressure loss in the honeycomb structure. This may be due to a significant influence of thickening cell walls even near the honeycomb center, on which exhaust gas tends to concentrate. The results indicate that the number of reinforced cells in the reinforced outer peripheral area is preferably 20 or less in order to prevent an increase in pressure loss, a reduction in the structural strength due to distortion, and breakage caused by stress concentration during canning.

Experimental Example 4

As shown in Table 4, samples were prepared in the same manner as sample 3 in Experimental Example 1 with their reinforced outer peripheral areas having different numbers of reinforced cells and cell walls with different wall thicknesses, and their isostatic strengths and pressure loss described in Experimental Example 3 were measured. In this experimental example, the prepared samples were specifically classified into samples each having a reinforced outer peripheral area with every cell wall of its cells having an equal wall thickness from the first cell to the last cell of the reinforced outer peripheral area in the direction from the outer peripheral wall toward the honeycomb central axis, and samples each having a reinforced outer peripheral area with the wall thicknesses of its cell walls being greatest at the first cell in the direction from the outer peripheral wall toward the honeycomb central axis and gradually decreasing from the outer peripheral wall toward the honeycomb central axis.

TABLE 4

| Sample No. | Satisfaction of requirement 5 | Upper row Lower row | Wall thickness of cell walls of reinforced outer peripheral area (μm) | | | | | | | | | | Isostatic strength (MPa) | Pressure loss (kPa) |
|---|---|---|---|---|---|---|---|---|---|---|---|---|---|---|
| | | | 1st cell 11th cell | 2nd cell 12th cell | 3rd cell 13th cell | 4th cell 14th cell | 5th cell 15th cell | 6th cell 16th cell | 7th cell 17th cell | 8th cell 18th cell | 9th cell 19th cell | 10th cell 20th cell | | |
| 21 | Satisfied | Upper row | 112 | 112 | 112 | 112 | 112 | 112 | — | — | — | — | 5.3 | 5.47 |
|    |           | Lower row | —   | —   | —   | —   | —   | —   | — | — | — | — |     |      |
| 22 | Satisfied | Upper row | 112 | 100 | 90  | 79  | 74  | 72  | — | — | — | — | 5.1 | 5.27 |
|    |           | Lower row | —   | —   | —   | —   | —   | —   | — | — | — | — |     |      |
| 23 | Satisfied | Upper row | 120 | 120 | 120 | 120 | 120 | 120 | 120 | 120 | 120 | 120 | 5.2 | 5.52 |
|    |           | Lower row | 120 | 120 | 120 | 120 | —   | —   | —   | —   | —   | —   |     |      |
| 24 | Satisfied | Upper row | 120 | 116 | 112 | 108 | 104 | 100 | 96  | 92  | 88  | 84  | 5.2 | 5.37 |
|    |           | Lower row | 80  | 76  | 72  | 68  | —   | —   | —   | —   | —   | —   |     |      |
| 25 | Satisfied | Upper row | 140 | 140 | 140 | 140 | 140 | 140 | 140 | 140 | 140 | 140 | 5.4 | 5.62 |
|    |           | Lower row | 140 | 140 | 140 | 140 | 140 | 140 | 140 | 140 | 140 | 140 |     |      |

TABLE 4-continued

| | | | Wall thickness of cell walls of reinforced outer peripheral area (μm) | | | | | | | | | | | | |
|---|---|---|---|---|---|---|---|---|---|---|---|---|---|---|---|
| Sample No. | Satisfaction of requirement 5 | Upper row Lower row | 1st cell 11th cell | 2nd cell 12th cell | 3rd cell 13th cell | 4th cell 14th cell | 5th cell 15th cell | 6th cell 16th cell | 7th cell 17th cell | 8th cell 18th cell | 9th cell 19th cell | 10th cell 20th cell | Isostatic strength (MPa) | Pressure loss (kPa) |
| 26 | Satisfied | Upper row | 140 | 136 | 132 | 128 | 124 | 120 | 116 | 112 | 108 | 104 | 5.3 | 5.42 |
| | | Lower row | 100 | 96 | 92 | 88 | 84 | 80 | 76 | 72 | 68 | 65 | | |

Table 4 shows the following. The comparisons between samples 21 and 22, samples 23 and 24, and samples 25 and 26 in Table 4 indicate that the structural strength of a honeycomb structure can be ensured without an increase in pressure loss for a reinforced outer peripheral area with the wall thicknesses of its cell walls being greatest at the first cell in the direction from the outer peripheral wall toward the honeycomb central axis and gradually decreasing from the outer peripheral wall toward the honeycomb central axis. This is because this configuration allows a gradual decrease in the stress toward the center of the honeycomb and the minimization of influence on the pressure loss, compared with a reinforced outer peripheral area with its cells having evenly thickened cell walls.

Experimental Example 5

As shown in Table 5, samples were prepared in the same manner as sample 3 in Experimental Example 1 with their reinforced outer peripheral areas having cell walls with different wall thicknesses, and their isostatic strengths were measured. In this experimental example, specifically, the cell walls forming the central cells within the central area had a wall thickness (average) of 65 μm. The cells within the reinforced outer peripheral areas had evenly thickened cell walls. For the reinforced outer peripheral areas, the wall thicknesses (averages) of the cell walls forming the first cells in the direction from the outer peripheral wall toward the honeycomb central axis are listed in Table 5.

TABLE 5

| | | Reinforced outer peripheral area | | | |
|---|---|---|---|---|---|
| Sample No. | Satisfaction of requirement 5 | Number of reinforced cells (cells) | Wall thickness of cell wall (μm) | Wall thickness of cell wall of 1st cell/Wall thickness of cell wall of central cell | Isostatic strength (MPa) |
| 13 | Satisfied | 6 | 75 | 1.15 | 2.5 |
| 27 | Satisfied | 6 | 90 | 1.38 | 2.7 |
| 28 | Satisfied | 6 | 105 | 1.62 | 3.4 |
| 29 | Satisfied | 6 | 112 | 1.72 | 3.6 |
| 30 | Satisfied | 6 | 120 | 1.85 | 3.6 |

Figure 17:
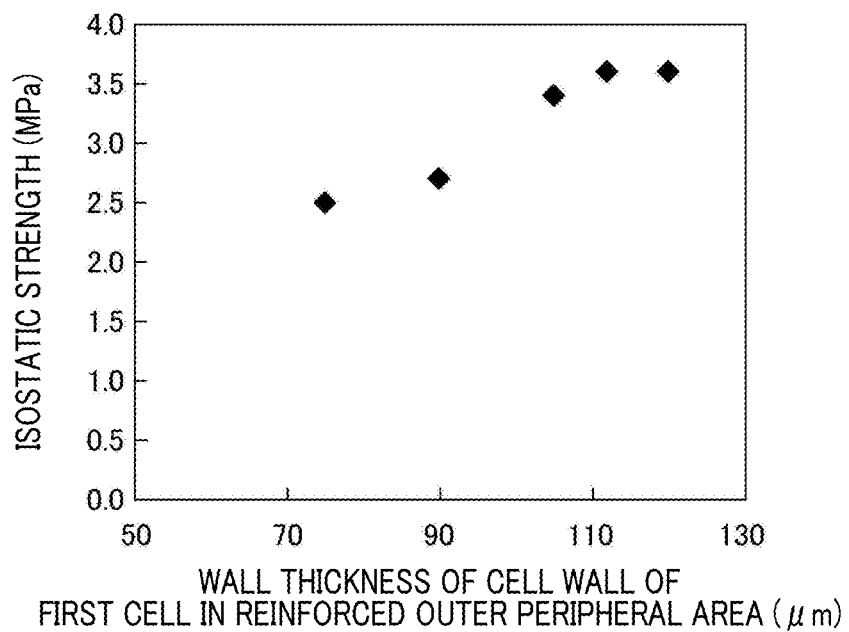
FIG. 17 is a graph showing the relationship between the isostatic strength and the wall thickness of the cell wall of the first cell in the reinforced outer peripheral area in Experimental Example 5.

Table 5 and FIG. 17 show the following. According to Table 5 and FIG. 17, when the first cell has cell walls with a wall thickness that is 1.4 or more times the wall thickness of the cell walls of central cell, the isostatic strength of the honeycomb structure can be easily improved. The results indicate that this configuration facilitates reducing stress in the first-cell area, which suffers the highest stress concentration during canning, and has an advantage in ease of improvement in the structural strength of the honeycomb structure.

The present disclosure is not limited to the embodiments and experimental examples described above, and may be modified variously without departing from the spirit and scope thereof. Furthermore, the configurations indicated in the embodiments and the experimental examples may be combined as appropriate. That is, although the present disclosure has been described based on the embodiments, it will be understood that the present disclosure is not limited to the embodiments or the configurations. This disclosure encompasses various modifications and alterations falling within the range of equivalence. Additionally, various combinations and forms as well as other combinations and forms with one, more than one, or less than one element added thereto also fall within the scope and spirit of the present disclosure.

What is claimed is:
1. A honeycomb structure comprising:
a plurality of cells adjacent to each other and quadrangular in cross section; a plurality of cell walls forming the plurality of cells; and an outer peripheral wall provided outside the plurality of cell walls and holding the cell walls, wherein as viewed in a cross section perpendicular to a honeycomb central axis, the honeycomb structure satisfies requirements 1 to 5:

Requirement 1: the honeycomb structure includes a central area having cell walls with a wall thickness equal to a wall thickness of a cell wall of four surrounding cells around the honeycomb central axis or a wall thickness of a cell wall of a central cell having a cell center with the honeycomb central axis passing therethrough, and a reinforced outer peripheral area having cell walls around the central area, the cell walls of the reinforced outer peripheral area having a wall thickness greater than the wall thickness of the cell wall of the four surrounding cells or the cell wall of the central cell;

Requirement 2: a plurality of cells arranged on an imaginary parallel line passing through the honeycomb central axis and parallel with cell walls or a plurality of cells arranged along over an imaginary perpendicular line passing through the honeycomb central axis and orthogonal to cell walls in a manner to extend through midpoints of the cell walls include a reference boundary cell having cell walls with different wall thicknesses on two sides parallel with the imaginary parallel line or the imaginary perpendicular line, and with the reference boundary cell including a thin wall being a thin cell wall on one side parallel with the imaginary parallel line or the imaginary perpendicular line and having a wall thickness represented as t1, a thick wall being a thick cell wall on the other side parallel with the imaginary parallel line or the imaginary perpendicular line and having a wall thickness represented as t3, an inner wall being a cell wall more adjacent to a honeycomb center than an outer cell wall of the reference boundary cell and orthogonal to the imaginary parallel line or the imaginary perpendicular line and having a wall thickness represented as t2, and the outer wall being a cell wall more adjacent to a honeycomb periphery than the inner wall of the reference boundary cell and orthogonal to the imaginary parallel line or the imaginary perpendicular line and having a wall thickness represented as t4, t1<t3, t2<t4, t1=t2, and t3=t4;

Requirement 3: the honeycomb structure includes a first reference cross-shaped unit having four cell walls: the thin wall, the inner wall, a cell wall extending in a direction opposite to the thin wall from a first reference cell vertex corresponding to a connection between the thin wall and the inner wall, and a cell wall extending from the first reference cell vertex in a direction opposite to the inner wall, and a second reference cross-shaped unit having four cell walls: the thick wall, the outer wall, a cell wall extending in a direction opposite to the thick wall from a second reference cell vertex corresponding to a connection between the thick wall and the outer wall, and a cell wall extending from the second reference cell vertex in a direction opposite to the outer wall;

Requirement 4: the honeycomb structure includes a plurality of cross-shaped units each having four cell walls extending vertically and horizontally from and connected to each other at alternate cell vertexes arranged along the cell walls from the first reference cell vertex or the second reference cell vertex as a starting point; and Requirement 5: for cross-shaped units with their respective cell vertexes within the central area, each cross-shaped unit with their respective cell vertexes within the central area has cell walls with a substantially equal wall thickness; and for cross-shaped units with their respective cell vertexes within the reinforced outer peripheral area, each cross-shaped unit with their respective cell vertexes within the reinforced outer peripheral area has cell walls with a substantially equal wall thickness.

2. The honeycomb structure according to claim 1, wherein the honeycomb structure has a wall thickness difference ratio of 10% or less, the ratio being calculated in accordance with a formula:

100×(tmax−tmin)/tmax, where tmax denotes a maximum wall thickness and tmin denotes a minimum wall thickness of the four cell walls forming each cross-shaped unit.

3. The honeycomb structure according to claim 2, wherein the wall thickness difference ratio is 5% or less.

4. The honeycomb structure according to claim 1, wherein the reinforced outer peripheral area extends to a fourth or any subsequent cell in a direction from the outer peripheral wall to the honeycomb central axis.

5. The honeycomb structure according to claim 1, wherein the reinforced outer peripheral area extends to a 20th or any previous cell in a direction from the outer peripheral wall to the honeycomb central axis.

6. The honeycomb structure according to claim 1, wherein the wall thickness of the cell walls forming the cells in the reinforced outer peripheral area is greatest at the first cell in a direction from the outer peripheral wall to the honeycomb central axis, and gradually decreases from the outer peripheral wall toward the honeycomb central axis.

7. The honeycomb structure according to claim 1, wherein the cell walls included in the reinforced outer peripheral area and forming the first cell in a direction from the outer peripheral wall to the honeycomb central axis are 1.4 or more times as thick as the cell walls forming the four surrounding cells or the central cell in the central area.

8. A honeycomb structure comprising:

a plurality of cells adjacent to each other and quadrangular in cross section; a plurality of cell walls forming the plurality of cells; and an outer peripheral wall provided outside the plurality of cell walls and holding the cell walls, wherein as viewed in a cross section perpendicular to a honeycomb central axis, the honeycomb structure satisfies requirements 1 to 4:

Requirement 1: the honeycomb structure includes a central area having cell walls with a wall thickness equal to a wall thickness of a cell wall of four surrounding cells around the honeycomb central axis or a wall thickness of a cell wall of a central cell having a cell center with the honeycomb central axis passing therethrough, and a reinforced outer peripheral area having cell walls around the central area, the cell walls of the reinforced outer peripheral area having a wall thickness greater than the wall thickness of the cell wall of the four surrounding cells or the cell wall of the central cell;

Requirement 2: a plurality of cells arranged on an imaginary parallel line passing through the honeycomb central axis and parallel with cell walls or a plurality of cells arranged along over an imaginary perpendicular line passing through the honeycomb central axis and orthogonal to cell walls in a manner to extend through midpoints of the cell walls include a reference boundary cell having cell walls with different wall thicknesses on two sides parallel with the imaginary parallel line or the imaginary perpendicular line, and with the reference boundary cell including a thin wall being a thin cell wall on one side parallel with the imaginary parallel line or the imaginary perpendicular line and having a wall thickness represented as t1, a thick wall being a thick cell wall on the other side parallel with the imaginary parallel line or the imaginary perpendicular line and having a wall thickness represented as t3, an inner wall being a cell wall more adjacent to a honeycomb center than an outer cell wall of the reference boundary cell and orthogonal to the imaginary parallel line or the imaginary perpendicular line and having a wall thickness represented as t2, and the outer wall being a cell wall more adjacent to a honeycomb periphery than the inner wall of the reference boundary cell and orthogonal to the imaginary parallel line or the imaginary perpendicular line and having a wall thickness represented as t4, t1<t3, t2<t4, t1=t2, and t3=t4;

Requirement 3: the honeycomb structure includes a first reference cross-shaped unit having four cell walls: the thin wall, the inner wall, a cell wall extending in a direction opposite to the thin wall from a first reference cell vertex corresponding to a connection between the thin wall and the inner wall, and a cell wall extending from the first reference cell vertex in a direction opposite to the inner wall, and a second reference cross-shaped unit having four cell walls: the thick wall, the outer wall, a cell wall extending in a direction opposite to the thick wall from a second reference cell vertex corresponding to a connection between the thick wall and the outer wall, and a cell wall extending from the second reference cell vertex in a direction opposite to the outer wall; and Requirement 4: the honeycomb structure includes a plurality of cross-shaped units each having four cell walls extending vertically and horizontally from and connected to each other at alternate cell vertexes arranged along the cell walls from the first reference cell vertex or the second reference cell vertex as a starting point.

9. The honeycomb structure according to claim 8, wherein the honeycomb structure has a wall thickness difference ratio of 10% or less, the ratio being calculated in accordance with a formula:

100×(tmax−tmin)/tmax, where tmax denotes a maximum wall thickness and tmin denotes a minimum wall thickness of the four cell walls forming each cross-shaped unit.

10. The honeycomb structure according to claim 9, wherein the wall thickness difference ratio is 5% or less.

11. The honeycomb structure according to claim 8, wherein the reinforced outer peripheral area extends to a fourth or any subsequent cell in a direction from the outer peripheral wall to the honeycomb central axis.

12. The honeycomb structure according to claim 8, wherein the reinforced outer peripheral area extends to a 20th or any previous cell in a direction from the outer peripheral wall to the honeycomb central axis.

13. The honeycomb structure according to claim 8, wherein the wall thickness of the cell walls forming the cells in the reinforced outer peripheral area is greatest at the first cell in a direction from the outer peripheral wall to the honeycomb central axis, and gradually decreases from the outer peripheral wall toward the honeycomb central axis.

14. The honeycomb structure according to claim 8, wherein the cell walls included in the reinforced outer peripheral area and forming the first cell in a direction from the outer peripheral wall to the honeycomb central axis are 1.4 or more times as thick as the cell walls forming the four surrounding cells or the central cell in the central area.

* * * * *